US011431667B2

(12) United States Patent
Zhang et al.

(10) Patent No.: US 11,431,667 B2
(45) Date of Patent: Aug. 30, 2022

(54) DISPLAY METHOD AND DEVICE

(71) Applicant: ALIBABA GROUP HOLDING LIMITED, Grand Cayman (KY)

(72) Inventors: Lili Zhang, Hangzhou (CN); Zhenhao Wu, Hangzhou (CN); Di Zhang, Hangzhou (CN); Jiandong Lai, Hangzhou (CN); Jiabao Wan, Hangzhou (CN)

(73) Assignee: ALIBABA GROUP HOLDING LIMITED, George Town (KY)

( * ) Notice: Subject to any disclaimer, the term of this patent is extended or adjusted under 35 U.S.C. 154(b) by 8 days.

(21) Appl. No.: 15/975,953

(22) Filed: May 10, 2018

(65) Prior Publication Data
US 2018/0331996 A1 Nov. 15, 2018

(30) Foreign Application Priority Data
May 12, 2017 (CN) .......................... 201710333547.7

(51) Int. Cl.
*H04L 51/234* (2022.01)
*H04L 51/00* (2022.01)
*H04L 65/1066* (2022.01)
*H04L 51/04* (2022.01)

(52) U.S. Cl.
CPC .............. *H04L 51/34* (2013.01); *H04L 51/04* (2013.01); *H04L 51/16* (2013.01); *H04L 65/1066* (2013.01)

(58) Field of Classification Search
CPC ..... H04L 51/34; H04L 51/04; H04L 65/1066; H04L 51/16

USPC ......................................................... 709/206
See application file for complete search history.

(56) References Cited

U.S. PATENT DOCUMENTS

| | | | |
|---|---|---|---|
| 6,539,421 | B1 | 3/2003 | Appelman et al. |
| 6,714,793 | B1 | 3/2004 | Carey et al. |
| 6,782,414 | B1 | 8/2004 | Xue et al. |
| 7,024,474 | B2 | 4/2006 | Clubb et al. |
| 7,047,525 | B2 | 5/2006 | Prunty et al. |
| 7,076,558 | B1 | 7/2006 | Dunn |
| 7,548,955 | B2 | 6/2009 | Nicholas, III |

(Continued)

FOREIGN PATENT DOCUMENTS

| | | |
|---|---|---|
| CN | 101645788 A | 2/2010 |
| CN | 103888345 A | 6/2014 |

(Continued)

OTHER PUBLICATIONS

International Search Report and Written Opinion for Application No. PCT/US2018/031974, dated Jul. 23, 2018, 15 pages.

(Continued)

*Primary Examiner* — Umar Cheema
*Assistant Examiner* — John Fan

(57) ABSTRACT

Display methods and devices are disclosed. An exemplary display method may comprise: displaying a session list page, the session list page comprising a session page entry corresponding to a communication session in which a local end user participates; determining a read/unread status of a sent communication message by the local end user in the communication session; and displaying, in a display area of the session page entry corresponding to the communication session, a status identifier corresponding to the read/unread status.

20 Claims, 20 Drawing Sheets

(56) References Cited

U.S. PATENT DOCUMENTS

| | | | |
|---|---|---|---|
| 7,657,846 B2 | 2/2010 | Banks et al. | |
| 8,731,589 B1 | 5/2014 | Oroskar et al. | |
| 9,003,447 B2 | 4/2015 | Harboe et al. | |
| 9,479,473 B2* | 10/2016 | Chang | H04L 51/32 |
| 10,345,992 B2* | 7/2019 | Hwang | H04M 1/2747 |
| 2002/0120697 A1 | 8/2002 | Generous et al. | |
| 2002/0130904 A1 | 9/2002 | Becker et al. | |
| 2004/0044735 A1 | 3/2004 | Hoblit | |
| 2004/0073626 A1* | 4/2004 | Major | H01T 13/16 |
| | | | 709/217 |
| 2004/0119740 A1 | 6/2004 | Chang et al. | |
| 2005/0080868 A1 | 4/2005 | Malik | |
| 2005/0108329 A1 | 5/2005 | Weaver et al. | |
| 2007/0143417 A1* | 6/2007 | Daigle | G06Q 10/107 |
| | | | 709/206 |
| 2008/0028027 A1 | 1/2008 | Jachner | |
| 2008/0144798 A1* | 6/2008 | Sidhom | H04M 3/436 |
| | | | 379/211.02 |
| 2009/0005011 A1 | 1/2009 | Christie et al. | |
| 2009/0006979 A1 | 1/2009 | Callanan et al. | |
| 2009/0063637 A1* | 3/2009 | Sun | H04L 12/1831 |
| | | | 709/206 |
| 2009/0240775 A1 | 9/2009 | Otaki | |
| 2010/0185584 A1 | 7/2010 | Vendrow et al. | |
| 2010/0217808 A1* | 8/2010 | Benninger | H04L 51/04 |
| | | | 709/206 |
| 2011/0145744 A1 | 6/2011 | Haynes et al. | |
| 2011/0231499 A1 | 9/2011 | Stovicek et al. | |
| 2012/0231770 A1 | 9/2012 | Clarke et al. | |
| 2013/0111428 A1 | 5/2013 | Begel et al. | |
| 2014/0075375 A1* | 3/2014 | Hwang | H04M 1/2747 |
| | | | 715/784 |
| 2014/0289644 A1 | 9/2014 | Clarke et al. | |
| 2014/0324984 A1* | 10/2014 | Chang | H04L 51/32 |
| | | | 709/206 |
| 2015/0271120 A1 | 9/2015 | Langholz | |
| 2016/0127321 A1* | 5/2016 | Fainkichen | G06F 9/45529 |
| | | | 726/4 |
| 2017/0111308 A1* | 4/2017 | Kim | H04L 51/34 |
| 2017/0257338 A1 | 9/2017 | Zhang et al. | |

FOREIGN PATENT DOCUMENTS

| | | |
|---|---|---|
| CN | 104301204 A | 1/2015 |
| CN | 104539511 A | 4/2015 |
| CN | 105487760 A | 4/2016 |
| CN | 105516296 A | 4/2016 |
| CN | 102656598 B | 5/2016 |
| CN | 105553826 A | 5/2016 |
| CN | 105812237 A1 | 7/2016 |
| EP | 2768249 B1 | 9/2019 |
| KR | 100986971 B1 | 10/2010 |
| TW | I559237 B | 11/2016 |

OTHER PUBLICATIONS

PCT International Preliminary Report on Patentability dated Nov. 21, 2019, issued in related International Application No. PCT/US2018/031974 (14 pages).
First Search dated Mar. 19, 2020, issued in related Chinese Application No. 201710333547.7 (2 pages).
First Office Action dated Mar. 30, 2020, issued in related Chinese Application No. 201710333547.7, with English machine translation (11 pages).
Written Opinion for Singaporean Application No. 11201910092T dated Apr. 7, 2021.
Supplementary Search for Chinese Application No. 201710333547.7 dated Mar. 16, 2021.
Search Report for Taiwanese Application No. 107106331 dated Apr. 15, 2022.

* cited by examiner

DISPLAY METHOD AND DEVICE

CROSS REFERENCE TO RELATED APPLICATIONS

The present application is based on and claims priority to the Chinese Application No. 201710333547.7, filed May 12, 2017, the entire contents of which are incorporated herein by reference.

TECHNICAL FIELD

The present application relates to the field of communication technologies, and in particular, to display methods and devices.

BACKGROUND

In related technologies, a communication application can establish a communication session between a local end user and an opposite end user, for the local end user and the opposite end user to exchange communication messages based on a corresponding communication session page to achieve communication processes.

If the opposite end user does not feedback promptly after the local end user sends a communication message to the opposite end user, however, it would be impossible for the local end user to determine whether the sent communication message has been read by the opposite end user. The local end user can only send another communication message to follow up, continue the wait for feedback from the opposite end user, or confirm with the opposite end user via phone calls or other manners, which leads to increase of operational complexity and decrease of communication efficiency for the local end user.

SUMMARY

To overcome the above-described disadvantages of current technologies, display methods and devices are disclosed herein. The disclosed systems and methods can simultaneously determine the read/unread status for sent communication messages in all communication sessions, obviating the need to enter a communication session page corresponding to each communication session, thereby simplifying user operations and improving the communication efficiency.

To achieve the above goal, various system, method, and storage medium embodiments are disclosed.

According to a first aspect, a display method may comprise: displaying a session list page, the session list page comprising a session page entry corresponding to a communication session in which a local end user participates; determining a read/unread status of a sent communication message by the local end user in the communication session; and displaying, in a display area of the session page entry corresponding to the communication session, a status identifier corresponding to the read/unread status. The session page entry meets a preset condition comprising at least one of: the corresponding communication session comprises at least one received group chat message in the unread status, and the received group chat message comprises separate notification instruction information for the local end user; the corresponding communication session is not shielded; or the corresponding communication session is used to transmit functional messages related to application functions.

In some embodiments, session page entries on the session list page comprise session page entries that meet a preset condition, while session page entries that do not meet the preset condition are hidden; and the preset condition comprises at least one of the following: the corresponding communication session comprises at least one received communication message in the unread status; the corresponding communication session comprises the at least one received group chat message in the unread status, and the received group chat message comprises the separate notification instruction information for the local end user; an opposite end communicating party of the corresponding communication session is a preset followed user of the local end user; a group to which the corresponding communication session belongs is a preset followed group of the local end user; the corresponding communication session is not shielded; or the corresponding communication session is used to transmit the functional messages related to the application functions.

According to another aspect, a display device is provided, comprising: a page displaying unit configured to display a session list page of a preset communication application, the session list page comprising a session page entry corresponding to a communication session in which a local end user participates; a status determining unit configured to determine a read/unread status of a sent communication message of the local end user in at least one communication session; and an identifier displaying unit configured to display, in a display area of the session page entry corresponding to the at least one communication session, a pre-defined status identifier corresponding to the read/unread status. The session page entry meets a preset condition comprising at least one of: the corresponding communication session comprises at least one received group chat message in the unread status, and the received group chat message comprises separate notification instruction information for the local end user; the corresponding communication session is not shielded; or the corresponding communication session is used to transmit functional messages related to application functions.

According to another aspect, a non-transitory computer-readable storage medium may store instructions that, when executed by a processor, cause the processor to perform a display method. The display method may comprise: displaying a session list page, the session list page comprising a session page entry corresponding to a communication session in which a local end user participates; determining a read/unread status of a sent communication message by the local end user in the communication session; and displaying, in a display area of the session page entry corresponding to the communication session, a status identifier corresponding to the read/unread status. The session page entry meets a preset condition comprising at least one of: the corresponding communication session comprises at least one received group chat message in the unread status, and the received group chat message comprises separate notification instruction information for the local end user; the corresponding communication session is not shielded; or the corresponding communication session is used to transmit functional messages related to application functions.

According to another aspect, a display system may comprise a processor and a non-transitory computer-readable storage medium storing instructions that, when executed by the processor, cause the processor to perform a display method. The display method may comprise: displaying a session list page, the session list page comprising a session page entry corresponding to a communication session in which a local end user participates; determining a read/unread status of a sent communication message by the local end user in the communication session; and displaying, in a display area of the session page entry corresponding to the communication session, a status identifier corresponding to the read/unread status. The session page entry meets a preset condition comprising at least one of: the corresponding communication session comprises at least one received group chat message in the unread status, and the received group chat message comprises separate notification instruction information for the local end user; the corresponding communication session is not shielded; or the corresponding communication session is used to transmit functional messages related to application functions.

According to the above technical solutions, the read/unread status of a sent communication message can be displayed at a session page entry on the session list page, so that the read/unread status corresponding to all communication sessions can be displayed on the session list page in a unified manner. A local end user can then learn about the read/unread status of a sent communication message in a corresponding communication session without having to individually enter a communication session page corresponding to each communication session. Thus, user operations are simplified, and the communication efficiency is improved.

BRIEF DESCRIPTION OF THE DRAWINGS

Figure 8:
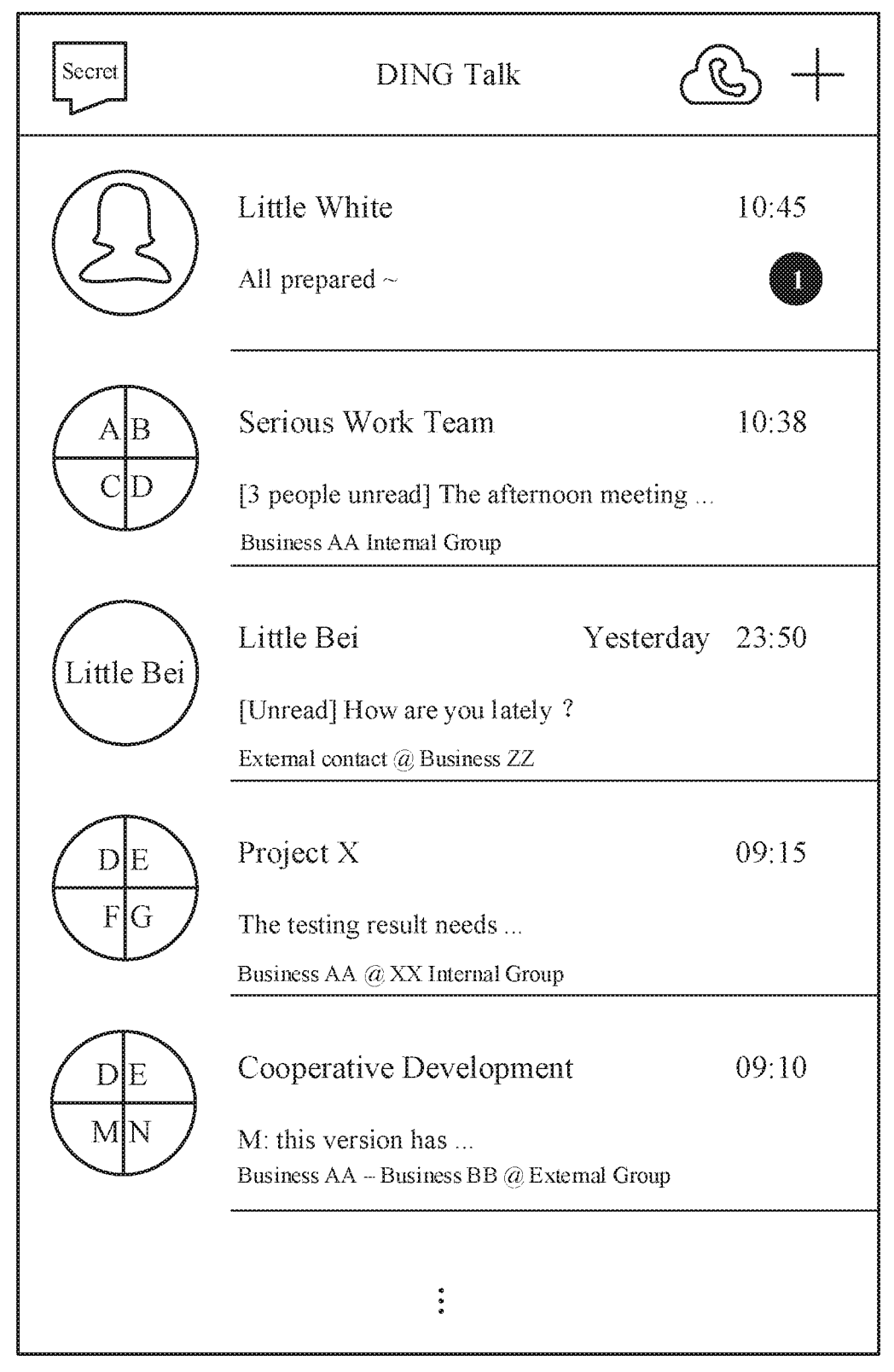

FIG. 3A to FIG. 12 are schematic diagrams of a session list page according to an exemplary embodiment of the present disclosure.

DETAILED DESCRIPTION

Figure 1:
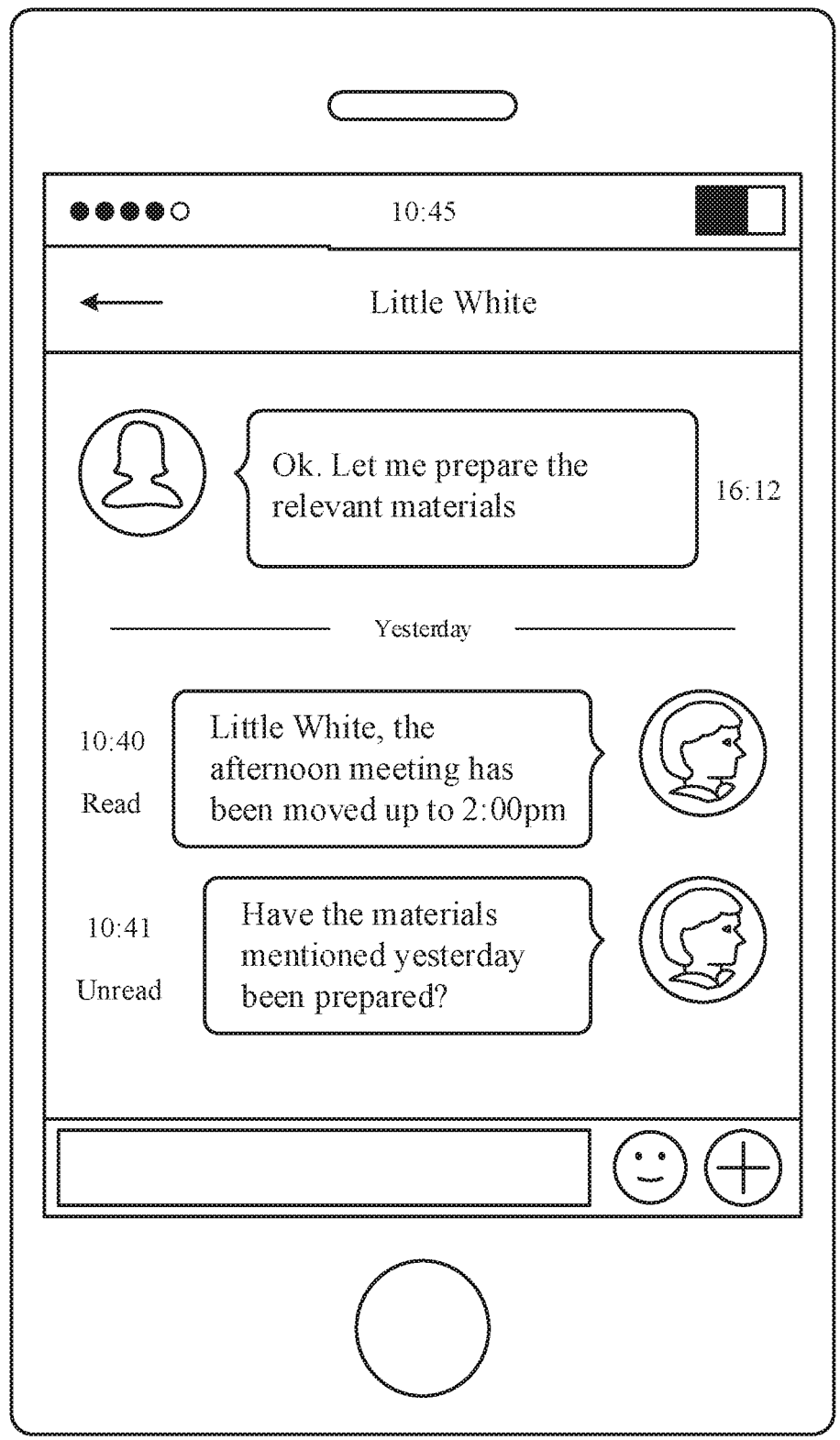
FIG. 1 is a schematic diagram of a communication session page according to related technologies.

FIG. 1 is a schematic diagram of a communication session page according to related technologies. Assuming that a local end user is "Little Black" and an opposite end user is "Little White," the two of them communicate with each other via a communication session established inside a preset communication application. FIG. 1 can be the communication session page of the local end user "Little Black" corresponding to the communication session. As shown in FIG. 1, the local end user "Little Black" sends two communication messages to the opposite end user "Little White" respectively. The communication session page not only displays message boxes that comprise the sent communication messages, but also displays the read/unread status of corresponding sent communication messages close to the message boxes (to the left of the message boxes in FIG. 1), namely whether the sent communication messages has been read by the opposite end user "Little White." In FIG. 1, for example, the sent communication message "Little White, the afternoon meeting has been moved up to 2:00 pm" has been read by the opposite end user "Little White" and therefore has been marked with "read" to indicate the read status. On the other hand, the sent communication message "Have the materials mentioned yesterday been prepared?" has not been read by the opposite end user "Little White" and therefore has been marked "unread" to indicate that the unread status.

As a result, the local end user "Little Black" can learn about whether the opposite end user "Little White" has read the above sent communication messages by viewing the communication session page shown in FIG. 1 to ensure smooth execution of subsequent operations.

In addition to the communications with the opposite end user "Little White," however, the local end user "Little Black" may also communicate with many other opposite end users at the same time. Consequently, the local end user "Little Black" has to repeatedly switch to the communication session pages corresponding to all opposite end users to view whether communication messages sent by himself/herself have been read by corresponding opposite end users. Therefore, the operations will be complicated for the local end user "Little Black," and moreover, it is very likely that some communication sessions would be missed during the repeated operations, which can cause subsequent operations to be delayed or on hold, and can affect the communication efficiency.

As such, the present disclosure can improve the display solution in communication applications to solve technical problems in related technologies.

Figure 2:
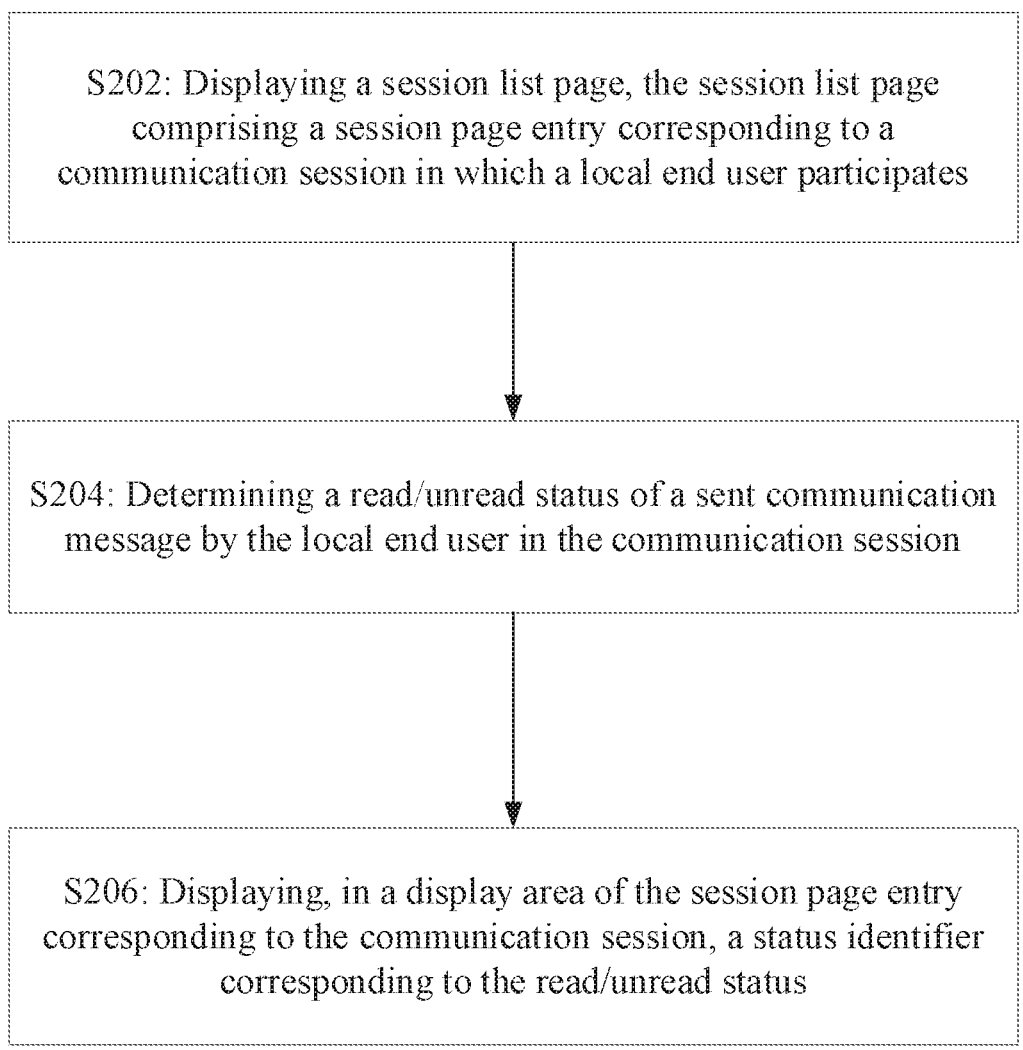
FIG. 2 is a flow chart of a display method according to an exemplary embodiment of the present disclosure.

FIG. 2 is a flow chart of a display method according to an exemplary embodiment of the present disclosure. As shown in FIG. 2, the method as implemented by a client of a preset communication application may comprise the following steps:

Step 202. Displaying a session list page (e.g., a session list page of the preset communication application), the session list page comprising a session page entry corresponding to a communication session in which a local end user participates.

In some embodiments, the present application does not limit the type of the preset communication application. For example, the preset communication application may be an instant communication application, such as DING Talk which is an Enterprise Instant Messaging (EIM) application.

In some embodiments, with a client application (APP) of the preset communication application installed on an electronic device and with a registered account of a local end user for the preset communication application logged-in, the electronic device can be configured as a client of the preset communication application corresponding to the local end user. Here, the electronic device may comprise a mobile device such as a cell phone or a tablet, or the electronic device may also comprise a non-mobile device such as a personal computer, which is not restricted in the present disclosure. When an online "client" such as an online "client" based on the HTML5 technology is used, the client can be run on an electronic device without having to install a corresponding APP on the electronic device.

In some embodiments, the session list page is used to display session page entries corresponding to all communication sessions. When a trigger operation by a user for a session page entry is detected, the display can switched to a communication session page of a communication session corresponding to the session page entry, so that the local end user can check received communication messages from an opposite end user or send a communication message to an opposite end user based on the communication session page.

In some embodiments, the client can display session page entries on the session list page in groups according to a preset dimension, wherein different groups of session page entries are displayed in display areas at different positions of the session list page. Here, the preset dimension may comprise at least one of the following: time period in which the latest communication time falls into, organizational affiliation information, top-pinning configuration, etc., which is not restricted by the present application. By displaying session page entries in groups, the local end user can select an interested session page entry based on the groups, with no need to traverse all session page entries on the session list page, which helps improve the communication efficiency.

In some embodiments, when a communication session has no unread received communication messages or sent communication messages in the unread status, the client can fold and hide a session page entry corresponding to the communication session in the display area corresponding to the group thereof. On one hand, session page entries that have unread received communication messages are kept for display, so that the local end user can directly and promptly check corresponding unread prompts (usually displayed in a display area of the corresponding session page entries); and session page entries that have sent communication messages in the unread status are kept for display, so that the local end user can quickly learn about whether the sent communication messages have been read by an opposite end user, thereby improving the communication efficiency. On the other hand, by folding and hiding communication sessions that do not have unread received communication messages or sent communication messages in the unread status, the display content of a session list page can be reduced when the session list page contains a relatively high number of session page entries, so that session page entries can be displayed on the same screen as much as possible, making it unnecessary for the local end user to flip the session list page, and thereby simplifying user operations and improving the communication efficiency. If the local end user wants to check and operate the session page entries that have been folded and hidden, the local end user can carry out a corresponding unfolding operation, to cause the originally folded and hidden session page entries to be re-displayed on the session list page.

In some embodiments, when a session elimination instruction for a group is detected, the client can delete all session page entries corresponding to the group from the session list page. Namely, all session page entries in the group are collectively deleted, and consequently, the user does not need to manually look for and delete each session page entry, which helps simplify operations for the user.

In some embodiments, session page entries on the session list page may comprise session page entries that meet a preset condition, while session page entries that do not meet the preset condition are hidden. In other words, the session list page can only display session page entries that meet the preset condition, while does not display session page entries that do not meet the preset condition, which can simplify the display content of the session list page, and help facilitate the user to read the session list page and improve the communication efficiency. In the case where only session page entries that meet a preset condition are displayed, the above group display solution may be applied to these session page entries that meet the preset condition. Namely, the session page entries can be displayed in groups according to the above preset dimensions to further improve the communication efficiency.

In some embodiments, the preset condition may comprise at least one of the following conditions.

A corresponding communication session comprises at least one received communication message in the unread status, wherein the received communication message can be a received individual chat message or a received group chat message.

A corresponding communication session comprises at least one received group chat message in the unread status, and the received group chat message comprises separate notification instruction information for the local end user. The separate notification instruction information can be in a form of "@+member name" or other forms. When the form of "@+member name" is used and if the "member name" is the name information of the local end user, it indicates that the received group chat message comprises separate notification instruction information for the local end user. The separate notification instruction information has a relatively high notification authorization level. As a result, even if a corresponding communication session is shielded (e.g., the "Do not disturb" function is turned on), a corresponding message receiving prompt can still be triggered as long as the received group chat message in the unread status comprises separate notification instruction information for the local end user.

An opposite end communicating party of a corresponding communication session is a preset followed user of the local end user.

A group to which a corresponding communication session belongs is a preset followed group of the local end user.

A corresponding communication session is not shielded, and the local end user can shield either an individual chat communication session or a group chat communication session.

A corresponding communication session is used to transmit functional messages related to application functions in the preset communication application. The application functions may be built-in functions in the preset communication application or third-party functions, which is not restricted in the present disclosure. Functional messages may be sent by a server of the preset communication application to the local end user in the manner of pushing and the like. The local end user can read the functional messages, respond to the functional messages, or execute other operations.

Other conditions may be applied to the technical solution of the present application, which will not be listed one by one herein and are not restricted in the present disclosure.

In some embodiments, a high-efficiency mode can be set for the session list page, and the on/off control is carried out by the local end user and the like. Here, when the high-efficiency mode of the session list page is configured to be in the on state, session page entries on the session list page only comprise session page entries that meet the preset condition to facilitate the local end user to carry out high-efficiency processing. When the high-efficiency mode of the session list page is configured to be in the off state, session page entries on the session list page comprise session page entries corresponding to all communication sessions in which the local end user participates, so that the local end user can check and process comprehensively.

Step 204. Determining a read/unread status of a sent communication message by the local end user in the communication session.

In some embodiments, the sent communication message can comprise any type of communication contents, such as texts, images, audios, videos, files, tasks (prompt messages with a processing deadline), management events (e.g., a group management event comprising attendance event, approval event, etc.) and the like, which is not restricted in the present disclosure.

Step 206. Displaying, in a display area of the session page entry corresponding to the at least one communication session, a status identifier (e.g., a pre-defined status identifier) corresponding to the read/unread status. In some embodiments, the session page entry meets a preset condition comprising at least one of: the corresponding communication session comprises at least one received group chat message in the unread status, and the received group chat message comprises separate notification instruction information for the local end user; the corresponding communication session is not shielded; or the corresponding communication session is used to transmit functional messages related to application functions.

In some embodiments, the communication session page is used to display communication messages from an opposite end user and receive communication messages input by the local end user, which requires a relatively large display and operating area. As a result, the communication session page often needs to be displayed on a full screen of an electronic device. On the other hand, a session page entry usually only comprises a name of a communication session, a head portrait of an opposite end user, preview contents and communication time of the latest communication message, and other preview information, which require a relatively small display and operating area to occupy. Therefore, all session page entries can be arranged for simultaneous display on the session list page, so that the local end user can check all session page entries simultaneously on the session list page, and select any session page entry for operations.

By displaying the read/unread status in the display area of a session page entry, the local end user can learn about whether a sent communication message is read by an opposite end user directly from the session list page without having to switch to the communication session page, which greatly simplifies the complexity of operations for the local end user and improves the communication efficiency. Meanwhile, since the session list page can simultaneously display all session page entries, the local end user can conveniently check other session page entries when checking a session page entry corresponding to any communication session, and then can promptly find changes to the read/unread statuses of other session page entries. As such, the local end user is reminded and will not miss some communication sessions during checking, which helps improve the communication efficiency.

In one embodiment, when the read/unread status indicates that a sent communication message in the unread status exists in a communication session, the client can display a pre-defined unread identifier, while for a communication session with all sent communication messages in the read status, the client does not display any pre-defined status identifier, so that a session page entry having the unread identifier is obviously different from other session page entries on the session list page (i.e., session page entries that do not have the unread identifier). Consequently, the local end user can quickly find, while browsing the session list page, a communication session with sent communication messages in the unread status.

In another embodiment, when the read/unread status indicates that all sent communication messages in any communication session are in the read status, the client can display a pre-defined read identifier, while for a communication session that has a sent communication message in the unread status, the client does not display any pre-defined status identifier, so that a session page entry having the read identifier is obviously different from other session page entries on the session list page (i.e., session page entries that do not have the read identifier). Consequently, the local end user can quickly find, while browsing the session list page, a communication session with a sent communication message that does not have the unread status.

In yet another embodiment, the client can display a pre-defined unread identifier when the read/unread status indicates that a sent communication message in the unread status exists in any communication session, and at the same time, display a pre-defined read identifier when the read/unread status indicates that all sent communication messages in any communication session are in the read/unread status, so that the local end user can quickly distinguish different session page entries based on the read identifier and the unread identifier, and determine whether sent communication messages in a corresponding communication session have been read.

In some embodiments, when a preview content of a communication message of a communication session is displayed in a display area of a session page entry corresponding to the communication session, the pre-defined status identifier can be displayed close to the preview content. For example, the pre-defined status identifier can be displayed in front of the preview content, so that the local end user can see the pre-defined status identifier first when checking a corresponding session page entry, and thus quickly determine whether a corresponding sent communication message has been read.

In some embodiments, when a trigger operation for the pre-defined status identifier is detected and if the read/unread status corresponding to the pre-defined status identifier is the unread status, the information of opposite end users who have not read the sent communication message can be displayed, so that the local end user can quickly and efficiently learn about the information of these opposite end users without having to enter a corresponding communication session page, which helps improve the communication efficiency. Here, the trigger operation can be in any form. For example, the local end user can use click, long press, heavy press, and the like, which is not restricted in the present disclosure.

In some embodiments, for an individual chat communication session between the local end user and an opposite end user, when the organizational affiliation information of the local end user is inconsistent with the organizational affiliation information of the opposite end user, the organizational affiliation information of the opposite end user can be displayed in a display area of a session page entry corresponding to the individual chat communication session. For a group chat communication session of a group to which the local end user belongs and when the group has organizational affiliation information, the organizational affiliation information of the group can be displayed in a display area of a session page entry corresponding to the group chat communication session, and the consistency between the organizational affiliation information of the local end user and the organizational affiliation information of the group is indicated. As such, the local end user can quickly learn about group affiliation of a corresponding communication session by checking the display area of each session page entry while browsing the session page entries, which facilitates the local end user to determine communication contents of corresponding communication sessions. For example, when the organizational affiliation information of a communication session is inconsistent with the organizational affiliation information of the local end user, the private content of the group content should not be mentioned in the communication content, which helps improve the communication security. At the same time, by displaying the above contents, such as organizational affiliation information, information like the name of a communication session can be quickly and effectively distinguished through the organizational affiliation information, even if the name may be changed by an opposite end user.

According to the above technical solution, in the present application, a read/unread status of a sent communication message can be displayed at a session page entry on the session list page, so that the read/unread statuses of all communication sessions can be displayed on the session list page in a unified way, and the local end user can learn about the read/unread status of a sent communication message in a corresponding communication session without having to enter a communication session page corresponding to each communication session separately, thereby simplifying user operations and improving the communication efficiency.

The technical solutions of the present disclosure will be described below with DING Talk (an Enterprise Instant Messaging (EIM) application) as an example and with reference to the accompanying drawings.

Figure 3A:
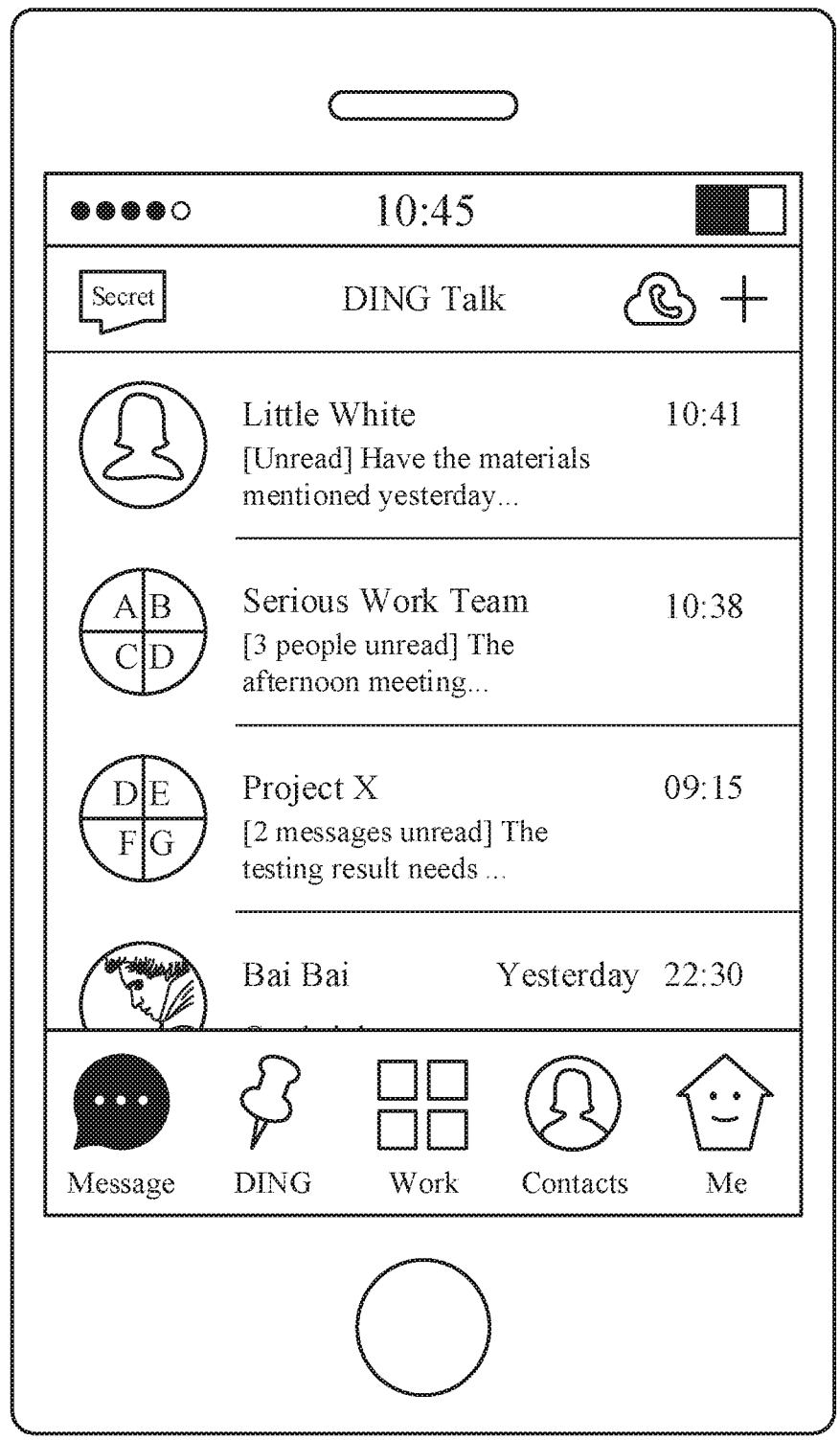

FIG. 3A is a schematic diagram of a session list page according to an exemplary embodiment of the present disclosure. As shown in FIG. 3A, the session list page displays session page entries corresponding to several communication sessions in a vertical arrangement, including a session page entry of an individual chat communication session between a local end user "Little Black" and an opposite end user "Little White," a session page entry of a group chat communication session of the group "Serious Work Team" to which the local end user "Little Black" belongs, a session page entry of a group chat communication session of the group "Project X" to which the local end user "Little Black" belongs, a session page entry of an individual chat communication session between the local end user "Little Black" and an opposite end user "Bai Bai", and the like. When any of the session page entries is triggered, the session list page shown in FIG. 3A can be switched to a communication session page of a corresponding communication session. For example, when a session page entry of an individual chat communication session between the local end user "Little Black" and the opposite end user "Little White" is triggered, the display can be switched to the communication session page shown in FIG. 1.

In the embodiment shown in FIG. 3A, the displayed session list page comes from a DING Talk client (i.e., the client of the EIM application DING Talk) corresponding to the local end user "Little Black." Namely, a registration account of the local end user "Little Black" is logged in on the DING Talk client, to cause the DING Talk client to uniquely correspond to the local end user "Little Black." As such, the DING Talk client used by the local end user "Little Black" can determine the read/unread status of communication messages sent by the local end user "Little Black" in each communication session respectively (i.e., whether the sent communication messages have been read by a corresponding opposite end user).

The individual chat communication session between the local end user "Little Black" and the opposite end user "Little White" is used as an example, assuming that the local end user "Little Black" sends a communication message, "Have the materials mentioned yesterday been prepared?" to the opposite end user "Little White." There can be one or more DING Talk clients correspondingly having an opposite end user "Little White," similar to the above DING Talk client used by the local end user "Little Black," and the DING Talk clients can send a message prompt to the opposite end user "Little White" according to the above communication message sent by the local end user "Little Black." When responding to the message prompt, the opposite end user "Little White" can read the corresponding communication message. Then, the DING Talk client corresponding to the opposite end user "Little White" can send a read notice to the DING Talk client corresponding to the local end user "Little Black," so that the DING Talk client corresponding to the local end user "Little Black" can determine that the read/unread status of the above sent communication message is a read status, or can determine that the read/unread status of the above sent communication message is an unread status when the read notice is not received. Based on the above process, the DING Talk client corresponding to the local end user "Little Black" can determine the read/unread status of each sent communication message in each communication session respectively.

As such, the DING Talk client corresponding to the local end user "Little Black" can display, in a display area of a session page entry corresponding to a communication session, a pre-defined unread identifier when the read/unread status indicates that a sent communication message in the unread status exists in the communication session. Examples are provided below:

For the individual chat communication session between the local end user "Little Black" and the opposite end user "Little White," "[unread]" can be displayed in a display area of the corresponding session page entry and used as the above unread identifier, indicating that a sent communication message that has not been read by the opposite end user "Little White" exists in the individual chat communication session.

For the group chat communication session of the group "Serious Work Team" to which the local end user "Little Black" belongs, "[3 people unread]" can be displayed in a display area of the corresponding session page entry and used as the above unread identifier, indicating that for the local end user "Little Black" one sent communication message in the unread status exists in the group chat communication session, and that there are still 3 group members in the group "Serious Work Team" who have not read the sent communication message.

For the group chat communication session of the group "Project X" to which the local end user "Little Black" belongs, "[2 messages unread]" can be displayed in a display area of the corresponding session page entry and used as the above unread identifier, indicating that two sent communication messages of the local end user "Little Black" in the unread status exist in the group chat communication session, and that, for each sent communication message, there is still at least one group member in the group "Project X" who has not read the sent communication message.

For the individual chat communication session between the local end user "Little Black" and the opposite end user "Bai Bai," no pre-defined status identifier will be displayed if all sent communication messages have been read by the opposite end user "Bai Bai."

As such, based on the embodiment shown in FIG. 3A, the local end user "Little Black" can determine, when browsing the session list page, whether a sent communication message in the unread status exists in a corresponding communication session according to whether a display area of each session page entry contains an unread identifier in the form of the above "[unread]," "[3 people unread]," "[2 messages unread]," etc. If a display area contains an unread identifier, it indicates that the communication session contains a sent communication message in the unread status. If a display area does not contain an unread identifier, it indicates that the communication session does not contain a sent communication message in the unread status.

Here, the individual chat communication session between the local end user "Little Black" and the opposite end user "Little White" is used as an example. As shown in FIG. 3A, assuming that the latest communication message in the individual chat communication session is "Have the materials mentioned yesterday been prepared?", a preview content of the communication message can be displayed in a display area of the corresponding session page entry, i.e., the "Have the materials mentioned yesterday . . . " shown in FIG. 3A. Correspondingly, the above unread identifier, "[unread]," can be displayed close to the preview content, for example, displayed in front of the preview content as shown in FIG. 3A (according to the current normal reading habit, the "front" may be understood as the "left" in FIG. 3A), so that the local end user "Little Black" can see this unread identifier first and then quickly learn that a sent communication message in the unread status exists in the corresponding communication session. Similarly, in other individual chat communication sessions or group chat communication sessions, an unread identifier can be displayed close to a preview content in a corresponding display area, which will not be repeated herein. Moreover, the unread identifier in the following embodiment can also be displayed close to a preview content in a corresponding display area, which will not be repeated herein.

Figure 3B:
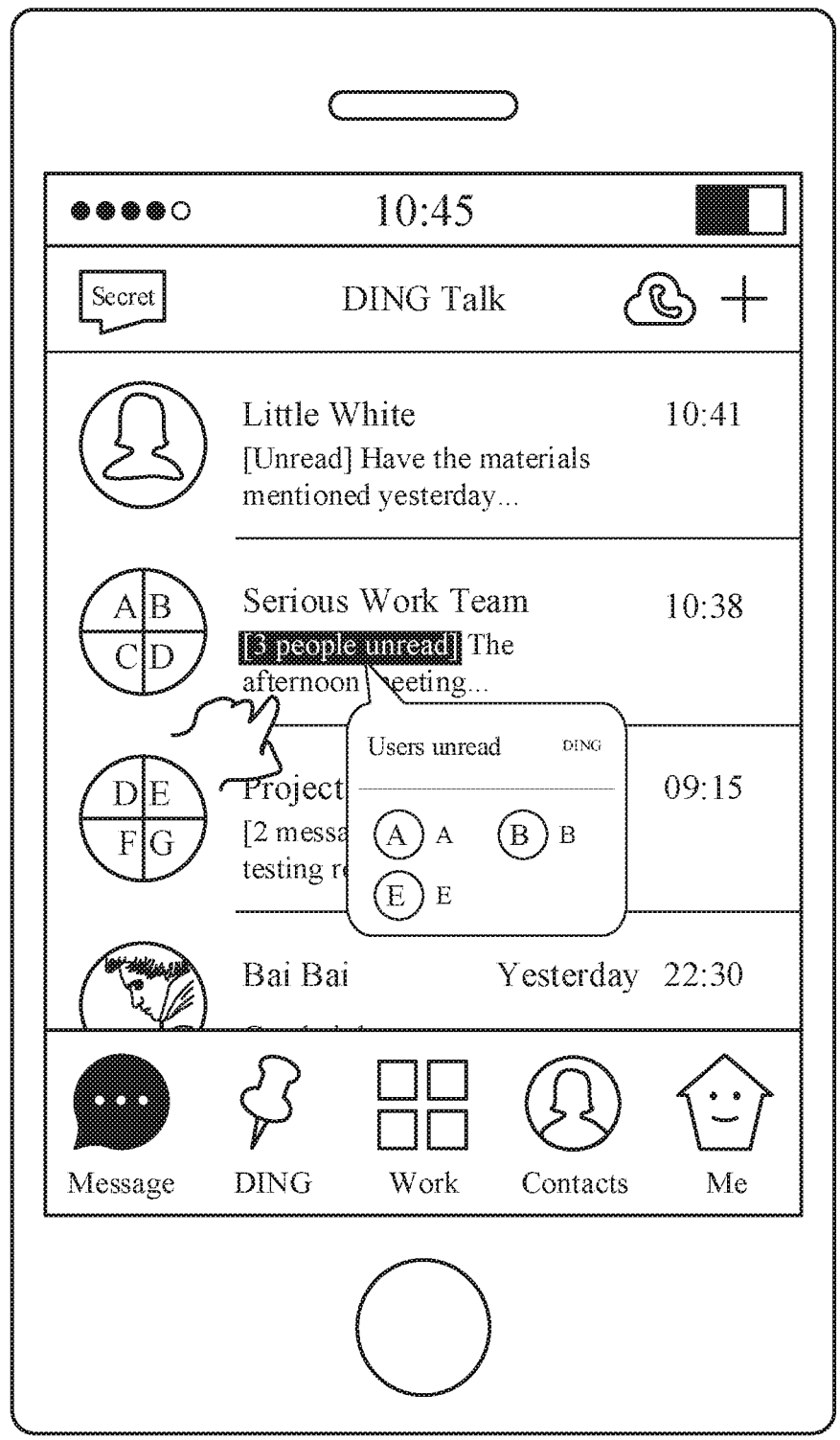

Furthermore, when a trigger operation by the local end user "Little Black" for any pre-defined status identifier is detected and if the read/unread status corresponding to the pre-defined status identifier is the unread status, the information of opposite end user who has not read the corresponding sent communication message can be displayed. As shown in FIG. 3B, with the group chat communication session of the group "Serious Work Team" to which the local end user "Little Black" belongs as an example, when a trigger operation by the local end user "Little Black" on the unread identifier "[3 people unread]" is detected, information of opposite end users who have not read the corresponding sent communication message can be displayed. For example, head portraits and names of opposite end users such as A, B, and E can be displayed in a pop-up window shown in FIG. 3B, indicating that the opposite end user A, the opposite end user B, and the opposite end user E have not read the corresponding sent communication message. The above solution is similarly applicable to an individual chat communication session, where information of corresponding opposite end users can also be displayed based on a trigger operation by the local end user on an unread identifier. For an individual chat communication session, headshots, names, and other information of opposite end users can similarly be displayed in a display area of a corresponding session page entry, and therefore, the local end user may not have a motivation to trigger the unread identifier, which however does not prevent the present embodiment from being applied in a scenario of individual chat communication session. Furthermore, a prompt identifier may be displayed in the pop-up window shown in FIG. 3B. For example, the prompt identifier may be "DING" at the upper right corner of the pop-up window shown in FIG. 3B. When a trigger operation on the prompt identifier is detected, a prompt message (e.g., a "DING message" provided by "DING Talk") may be sent directly to opposite end users in the pop-up window (i.e., the opposite end users who have not read the corresponding sent communication message) in one example, so as to prompt the opposite end users to read the corresponding sent communication message; and in another example, a page to edit the prompt message can be opened, the opposite end users in the pop-up window can be automatically added as receiving parties, and then the local end user can further determine whether to send the prompt message.

Here, the trigger operation used by the local end user can comprise a variety of forms. For example, click, long press, heavy press, and the like can be performed on an unread identifier, which is not restricted in the present disclosure.

Figure 4:
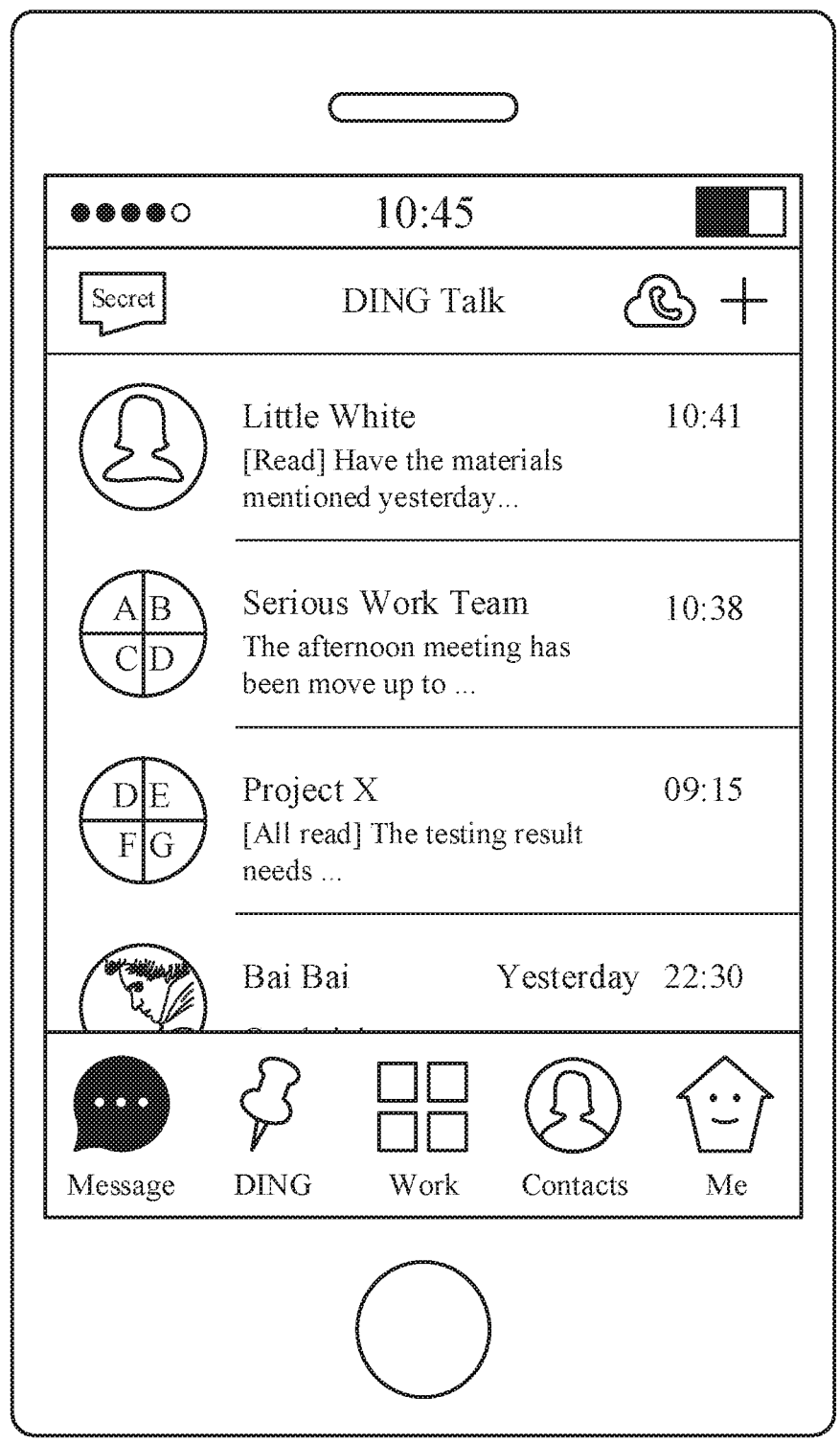

FIG. 4 is a schematic diagram of another session list page according to an exemplary embodiment of the present disclosure. As shown in FIG. 4, on a session list page similar to that in FIG. 3A, a DING Talk client corresponding to the local end user "Little Black" can display, in a display area of a session page entry corresponding to a communication session, a pre-defined read identifier when the read/unread status indicates that all sent communication messages in the a communication session are in the read status. Examples are provided below:

For the individual chat communication session between the local end user "Little Black" and the opposite end user "Little White," "[read]" can be displayed in a display area of the corresponding session page entry and used as the above read identifier, indicating that all sent communication messages in the individual chat communication session have been read by the opposite end user "Little White."

For the group chat communication session of the group "Serious Work Team" to which the local end user "Little Black" belongs, no pre-defined status identifier may be displayed in a display area of the corresponding session page entry, indicating that at least one sent communication message of the local end user "Little Black" in the unread status exists in the group chat communication session, and that there is at least one group member in the group "Serious Work Team" who has not read the sent communication message.

For the group chat communication session of the group "Project X" to which the local end user "Little Black" belongs, "[all read]" can be displayed in a display area of the corresponding session page entry and used as the above read identifier, indicating that all sent communication messages of the local end user "Little Black" in the group chat communication session have been read by all group members in the group "Project X."

As such, based on the embodiment shown in FIG. 4, the local end user "Little Black" can determine, when browsing the session list page, whether a sent communication message in the read status exists in a corresponding communication session according to whether a display area of each session page entry contains a read identifier in the form of the above "[read]," "[all read]," etc. If a display area contains a read identifier, it indicates that all sent communication messages are in the read status. If a display area does not contain a read identifier, it indicates that at least one sent communication message in the unread status exists.

Figure 5:
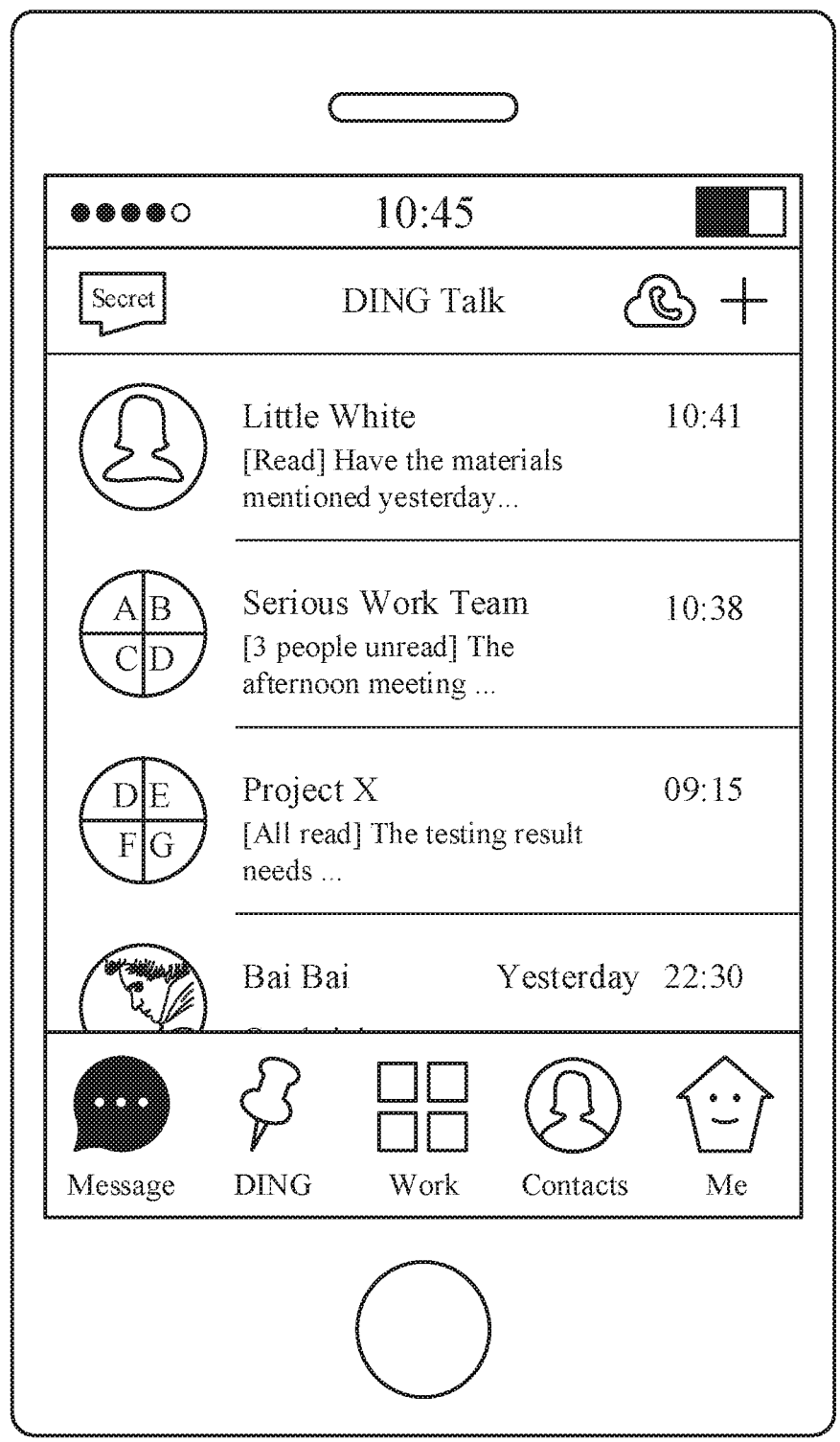

The above unread identifiers and read identifiers can be used at the same time, to mark communication sessions on a session list page respectively. FIG. 5 is a schematic diagram of yet another session list page according to an exemplary embodiment of the present disclosure. As shown in FIG. 5, on a session list page similar to that in FIGS. 3A-4, a DING Talk client corresponding to the local end user "Little Black" can simultaneously implement the following: displaying, in a display area of a session page entry corresponding to a communication session, a pre-defined unread identifier when the read/unread status indicates that a sent communication message in the unread status exists in the communication session, and displaying, in a display area of a session page entry corresponding to any communication session, a pre-defined read identifier when the read/unread status indicates that all sent communication messages in the communication session are in the read status. Examples are provided below:

For the individual chat communication session between the local end user "Little Black" and the opposite end user "Little White," "[read]" can be displayed in a display area of the corresponding session page entry and used as the above read identifier, indicating that all sent communication messages in the individual chat communication session have been read by the opposite end user "Little White."

For the group chat communication session of the group "Serious Work Team" to which the local end user "Little Black" belongs, "[3 people unread]" can be displayed in a display area of the corresponding session page entry and used as the above unread identifier, indicating that one sent communication message of the local end user "Little Black" in the unread status exists in the group chat communication session, and that there are still 3 group members in the group "Serious Work Team" who have not read the sent communication message.

For the group chat communication session of the group "Project X" to which the local end user "Little Black" belongs, "[all read]" can be displayed in a display area of the corresponding session page entry and used as the above read identifier, indicating that all sent communication messages of the local end user "Little Black" in the group chat communication session have been read by all group members in the group "Project X."

In the above embodiments, the pre-defined status identifiers, such as "[unread]," "[3 people unread]," "[2 messages unread]," "[read]," "[all read]," etc., are all exemplary embodiments, and other pre-defined status identifiers in any form may be used, which is not restricted in the present disclosure. By displaying the above pre-defined status identifiers on a session list page, the local end user "Little Black" can check, when checking the session list page, all displayed session page entries simultaneously, and can quickly identify whether a sent communication message in the unread status exists in each communication session based on the above pre-defined status identifiers, with no need to separately enter each communication session page, thereby simplifying user operations and improving the communication efficiency.

In some embodiments, the local end user "Little Black" can participate in communication sessions with any contact or communication sessions established for a group. Session page entries corresponding to these communication sessions are displayed, respectively, on a session list page, such as the one shown in FIGS. 3A-5. At the same time, in addition to displaying the session page entries, the session list page can further display function page entries corresponding to application functional pages of other application functions in the EIM application DING Talk (or any other communication applications). For example, the other application functions can comprise: mail functions, contact recommendation functions, group management functions (e.g., attendance function, approval function, etc.), and the like. In short, since the above session page entries and function page entries need to be displayed simultaneously on a session list page, the display content on the session list page is very likely to exceed the display capability of a screen of an electronic device due to the limited screen size of the electronic device, resulting in an "overloading" of the display content on the session list page.

Figure 6:
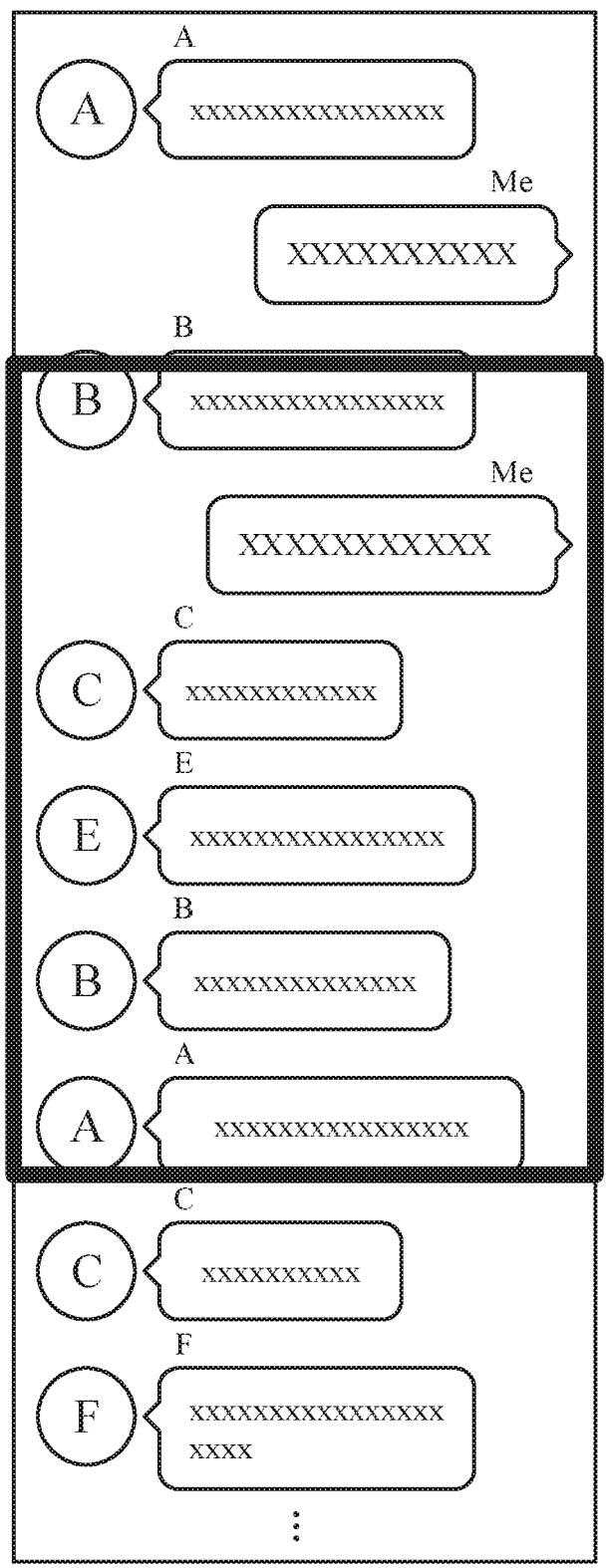

When the "overloading" occurs, the electronic device or the DING Talk client itself does not show any problem like display error, but could cause inconvenience in a user browsing process. For example, as shown in FIG. 6, the rectangular block of a black thickened line corresponds to the screen size of the electronic device. When the "overloading" occurs to a session list page, the size of the session list page will go beyond the screen size, and a user (e.g., the above local end user "Little Black") has to move a desired page display content into the rectangular block by swiping the session list page up and down before the corresponding page display content can be viewed.

Figure 7:
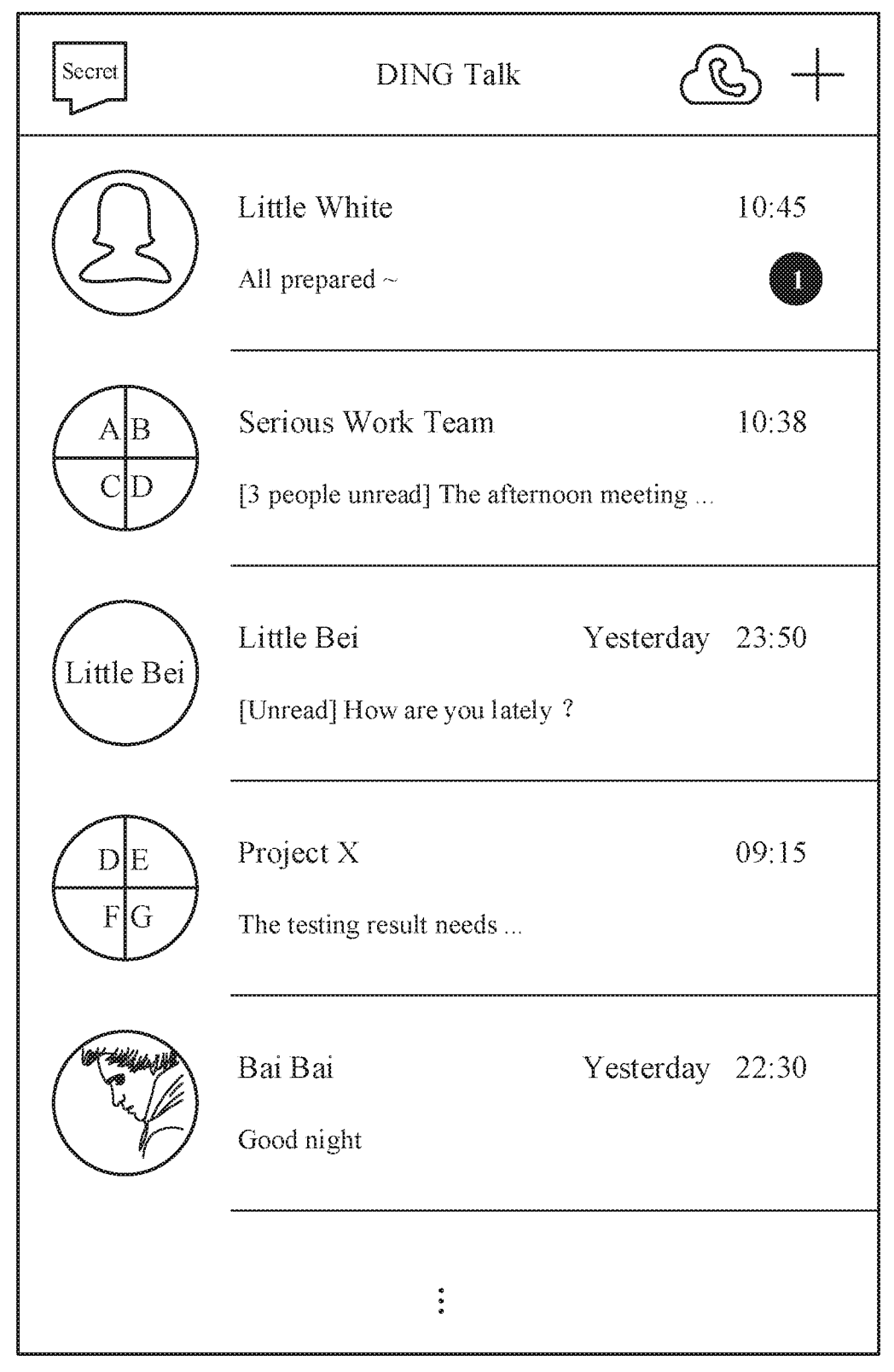

Since session list pages always display, by default, the topmost page display content on the screen of an electronic device (i.e., in the rectangular block shown in FIG. 6), session page entries on a session list page can be further arranged in an order according to the technical solutions of the present disclosure, to cause a page display content which a user is more interested in to be displayed preferentially on the screen of the electronic device, and making it unnecessary for the user to manually flip the session list page. For example, as shown in FIG. 7, session page entries on a session list page can be arranged according to the following rules:

1) A session page entry corresponding to a communication session having an unread message has the priority to be displayed. In the individual chat communication session between the local end user "Little Black" and the opposite end user "Little White," for example, when there is a received communication message from the opposite end user "Little White" that has not been read by the local end user "Little Black," the corresponding session page entry can be pinned at the top for display, and a prompt identifier "①" can be displayed in a display area of the session page entry to indicate that there is an unread message (i.e., the prompt identifier may be a remaining number of unread messages, which is not restricted in the present disclosure).

Here, when there is a plurality of communication sessions having unread messages at the same time, a plurality of corresponding session page entries can be arranged in a preset order. For example, session page entries corresponding to these communication sessions can be arranged in a reverse order of receiving moments of the latest unread messages in the communication sessions. Namely, a session page entry with a later receiving moment has a higher arrangement position, so that a user can check the latest communication messages first.

2) For communication sessions that do not have an unread message, session page entries corresponding to communication sessions having sent communication messages in the unread status have the priority to be displayed. In the group chat communication session of the group "Serious Work Team" to which the local end user "Little Black" belongs, for example, assuming that there is a communication message sent by the local end user "Little Black," and that there are still 3 group members in the group "Serious Work Team" who have not read the sent communication message, an unread identifier in the form of "[3 people unread]" can be displayed in a corresponding session page entry. Moreover, for an individual chat communication session between the local end user "Little Black" and an opposite end user "Little Bei," assuming that a communication message "how are you recently?" sent by the local end user "Little Black" has not been read by the opposite end user "Little Bei," an unread identifier in the form of "[unread]" can be displayed in a corresponding session page entry.

Based on the above rule, 1) the session page entries corresponding to the group chat communication session of the group "Serious Work Team" to which the local end user "Little Black" belongs and the individual chat communication session between the local end user "Little Black" and the opposite end user "Little Bei" are consequently both arranged behind session page entries corresponding to all communication sessions that have unread messages (e.g., both arranged below the session page entry corresponding to the individual chat communication session between the local end user "Little Black" and the opposite end user "Little White" in FIG. 7), and both arranged before session page entries corresponding to communication sessions that neither have unread messages nor have sent communication messages in the unread status (e.g., both arranged above the session page entries corresponding to the group chat communication session of the group "Project X" to which the local end user "Little Black" belongs and the individual chat communication session between the local end user "Little Black" and the opposite end user "Bai Bai" in FIG. 7).

When there is a plurality of communication sessions having sent communication messages in the unread status at the same time, a plurality of corresponding session page entries can be arranged in a preset order, similar to the above rule 1). For example, session page entries corresponding to these communication sessions can be arranged in a reverse order of receiving moments of the latest sent communication messages in the unread status in the communication sessions. Alternatively, session page entries corresponding to these communication sessions can be arranged in a reverse order of communication moments of the latest communication messages in the communication sessions.

The logic behind the above rule 1) and rule 2) is: the priority of unread messages>the priority of sent communication messages in the unread status>the priority of read messages and sent communication messages in the read status. In fact, the above rules may change accordingly based on any changes to the above logic. For example, if it is decided that the priority of sent communication messages in the unread status>the priority of unread messages, the priority display orders of "unread messages" and "sent communication messages in the unread status" in the above rule 1) and rule 2) can be changed accordingly, which will not be repeated herein.

In some embodiments, for session page entries corresponding to communication sessions displayed on a session list page, the DING Talk client can display and prompt the organizational affiliation information of each communication session and the organizational affiliation information of the local end user to the local end user, to facilitate the local end user to determine contents of talks on a corresponding communication session page, for example, to avoid sending internal private contents of a business in an external group, so as to improve the communication security. Especially when session page entries on a session list page are not displayed in groups according to the organizational affiliation information, the local end user can be effectively prompted. Examples are provided below:

In one embodiment, for an individual chat communication session between the local end user and an opposite end user, when the organizational affiliation information of the local end user is inconsistent with the organizational affiliation information of the opposite end user, the organizational affiliation information of the opposite end user can be displayed in a display area of a session page entry corresponding to the individual chat communication session. As shown in FIG. 8, where an individual chat communication session between the local end user "Little Black" and an opposite end user "Little Bei" is used as an example, assuming that the organizational affiliation information of the local end user "Little Black" is Business AA and the organizational affiliation information of the opposite end user "Little Bei" is Business ZZ, the organizational affiliation information of the local end user "Little Black" is inconsistent with the organizational affiliation information of the opposite end user "Little Bei." The organizational affiliation information "Business ZZ" of the opposite end user "Little Bei" can be displayed in a display area of the corresponding session page entry as a prompt to the local end user "Little Black." Furthermore, to describe the inconsistency of organizational affiliation information more specifically, the "external contact A Business ZZ" can be displayed in FIG. 8, to indicate that the opposite end user "Little Bei" is an "external contact" relative to Business AA to which the local end user "Little Black" belongs. Here, in the embodiment shown in FIG. 8, the "external contact @Business ZZ" (or the "Business ZZ") can be displayed at the bottom of the display area of the session page entry corresponding to the communication session, which is not restricted in the present disclosure.

In another embodiment, for a group chat communication session of a group to which the local end user belongs and when the group has organizational affiliation information, the organizational affiliation information of the group can be displayed in a display area of a session page entry corresponding to the group chat communication session, and the consistency between the organizational affiliation information of the local end user and the organizational affiliation information of the group is indicated.

Here, as shown in FIG. 8, the group "Serious Work Team" to which the local end user "Little Black" belongs is used as an example. Assuming that the organizational affiliation information of the group "Serious Work Team" is Business AA, "Business AA" can be displayed in a display area of a session page entry of a corresponding group chat communication session. Furthermore, the above "Business AA" can be updated to "internal group of Business AA," which indicates that the organizational affiliation information of the local end user "Little Black" is consistent with the organizational affiliation information of the group "Serious Work Team" through the "internal group."

With the group "Project X" to which the local end user "Little Black" belongs as another example, assuming that the group "Project X" has a Department XX with the organizational affiliation information being Business AA, "Business AA Department XX" can be displayed in a display area of a session page entry of a corresponding group chat communication session, to indicate the affiliation relationship of the organizational affiliation information of the group "Project X" and the corresponding main business "Business AA" Moreover, the form of "internal group of Business AA Department XX" can be used to indicate that the organizational affiliation information of the local end user "Little Black" is consistent with the organizational affiliation information of the group "Project X."

With a group "Cooperative Development" to which the local end user "Little Black" belongs as another example, assuming that the group "Cooperative Development" has the organizational affiliation information of Business AA and Business BB, namely, this group is a trans-organization group between Business AA and Business BB, then "Business AA-Business BB" can be displayed in a display area of a session page entry of a corresponding group chat communication session, to correspond to the "trans-organization group between Business AA and Business BB." Moreover, the form of "trans-business group @ Business AA-Business BB" can be used to indicate that the organizational affiliation information of the local end user "Little Black" is partially consistent with the organizational affiliation information of the group "Project X." For example, the local end user "Little Black" belongs to Business AA, while the group "Project X" simultaneously corresponds to Business AA and Business BB.

In some embodiments, when a session list page of a preset communication application is displayed, session page entries on the session list page can be displayed in groups according to a preset dimension, to cause different groups of session page entries to be displayed in display areas at different positions of the session list page. As such, a user can quickly locate, based on the currently used grouping dimension, a group in which an interested communication session is, and find a session page entry corresponding to the interested communication session in the group, thereby improving the communication efficiency based on the communication application by accelerating the speed at which the user finds a session page entry corresponding to a communication session.

In one embodiment, the preset dimension for grouping session page entries may comprise top pinning situation, based on which session page entries on a session list page can be divided into two groups: a top pinning group and a non-top pinning group. Wherein session page entries in the top pinning group are located in a first display area of the session list page, session page entries in the non-top pinning group are located in a second display area of the session list page, and the first display area is different from the second display area. With the session list page shown in FIG. 9 as an example, when the session page entries on the session list page are arranged sequentially in a vertical direction, the first display area corresponding to the above top pinning group can be at the top of the session list page, and the second display area corresponding to the non-top pinning group can be below the first display area, so that a user can always first see session page entries in the first display area when opening the session list page by default and learn about information related to interested communication sessions as quickly as possible. Here, session page entries in the top pinning group and session page entries in the non-top pinning group can be displayed in different manners to facilitate the user to distinguish them visually. For example, in FIG. 9, a triangle can be displayed at the upper right corner of display areas of session page entries in the top pinning group, while no triangle will be displayed for session page entries in the non-top pinning group, which is not restricted in the present disclosure.

Figure 10:

In another embodiment, the preset dimension for grouping session page entries may comprise a time period in which the latest communication time falls (i.e., the communication time corresponding to the latest communication message in a communication session; if the latest communication message is sent by a local end user, the communication time is the corresponding sending time; if the latest communication message is received by the local end user, the communication time is the corresponding receiving time). For example, as shown in FIG. 10, based on the time period in which the latest communication time falls, the session page entries can be divided into "today," "yesterday," "this week," "this month (assuming to be November)," "October," "earlier," etc. The "today" group comprises session page entries of all communication sessions with the latest communication time on "today (e.g., Friday, Nov. 11, 2016)," the "yesterday" group comprises session page entries of all communication sessions with the latest communication time on "yesterday (e.g., Thursday, Nov. 10, 2016)," the "this week" group comprises session page entries of all communication sessions with the latest communication time before "yesterday" and in "this week" (e.g., between Nov. 6, 2016 and Nov. 9, 2016), and so forth.

Any other type of preset dimensions can be used for grouping processing, which is not restricted in the present disclosure. For example, session page entries can be divided into "intra-business," "cooperative business," "non-cooperative business," and "non-business individual" based on organizational affiliation information, which can achieve a grouping effect similar to the above dimensions and will not be repeated herein. Here, the same session list page can be divided into groups based on a plurality of dimensions at the same time. For example, as shown in FIG. 10, the session page entries can be divided into the top pinning group and the non-top pinning group based on the top pinning situation, and furthermore, the session page entries in the non-top pinning group can be divided into several groups, such as "today," "yesterday," . . . and "earlier," based on "the time period in which the latest communication time falls" (the session page entries in the top pinning group can also be further divided based on "the time period in which the latest communication time falls," which however is not adopted in the embodiment shown in FIG. 10). Moreover, any number of types of preset dimensions can be used for group division of session page entries on the same session list page, which will not be repeated herein. Here, for some dimensions like "top pinning situation," a user can configure a group for each session page entry according to actual needs. For dimensions like "the time period in which the latest communication time falls" and "organizational affiliation information," however, the division is carried out according to attributes of session page entries or communication messages thereof, which makes it impossible for the user to perform manual configuration.

Figure 9:

In some embodiments, received communication messages and sent communication messages can be identified for each communication session in each group after division, respectively. When a communication session does not have unread received communication messages and sent communication messages in the unread status, a session page entry corresponding to the communication session can be folded and hid in the display area corresponding to the group thereof. For example, as shown in FIG. 9, a sent communication message in the unread status (which may be marked by an unread identifier "[3 people unread]") exists in a communication session corresponding to the group "Serious Work Team" to which the local end user "Little Black" belongs, and unread received communication messages exist in a communication session corresponding to the group "Project X" to which the local end user "Little Black" belongs (a total of 3 messages marked with the identifier "③"). Therefore, session page entries of these two communication sessions can be displayed in a display area corresponding to the top pinning group, while other session page entries in the top pinning group can be folded, hidden, and replaced with the option "click to show all" shown in FIG. 9. By folding and hiding some session page entries, the attention of the local end user can focus on unread received communication messages and sent communication messages in the unread status, and the local end user does not need to actively flip and search. On the other hand, session page entries that the local end user may follow are displayed on the same screen of an electronic device as much as possible, namely, they are all displayed within the rectangular block shown in FIG. 6, making it unnecessary for the local end user to roll the session list page up and down, which helps simplify user operations and improves the information acquisition efficiency for the local end user. Here, when the local end user is interested in the folded and hidden session page entries, the local end user can trigger the option "click to show all" shown in FIG. 9 to invoke the session page entries that are originally folded and hidden, to facilitate the local end user to check or trigger an interested session page entry.

The folding and hiding processing on session page entries is not limited to the top pinning group shown in FIG. 9. A similar processing manner may be applied to any group based on any preset dimension. Namely, when any communication session in the any group does not have unread received communication messages and sent communication messages in the unread status, folding and hiding can be performed on a session page entry corresponding to the any communication session in a display area corresponding to the group. For example, as shown in FIG. 10, folding and hiding can be performed on all session page entries that meet the above description for the "today" group, the "yesterday" group, and the like in the non-top pinning group, which will not be repeated herein.

Figure 11:
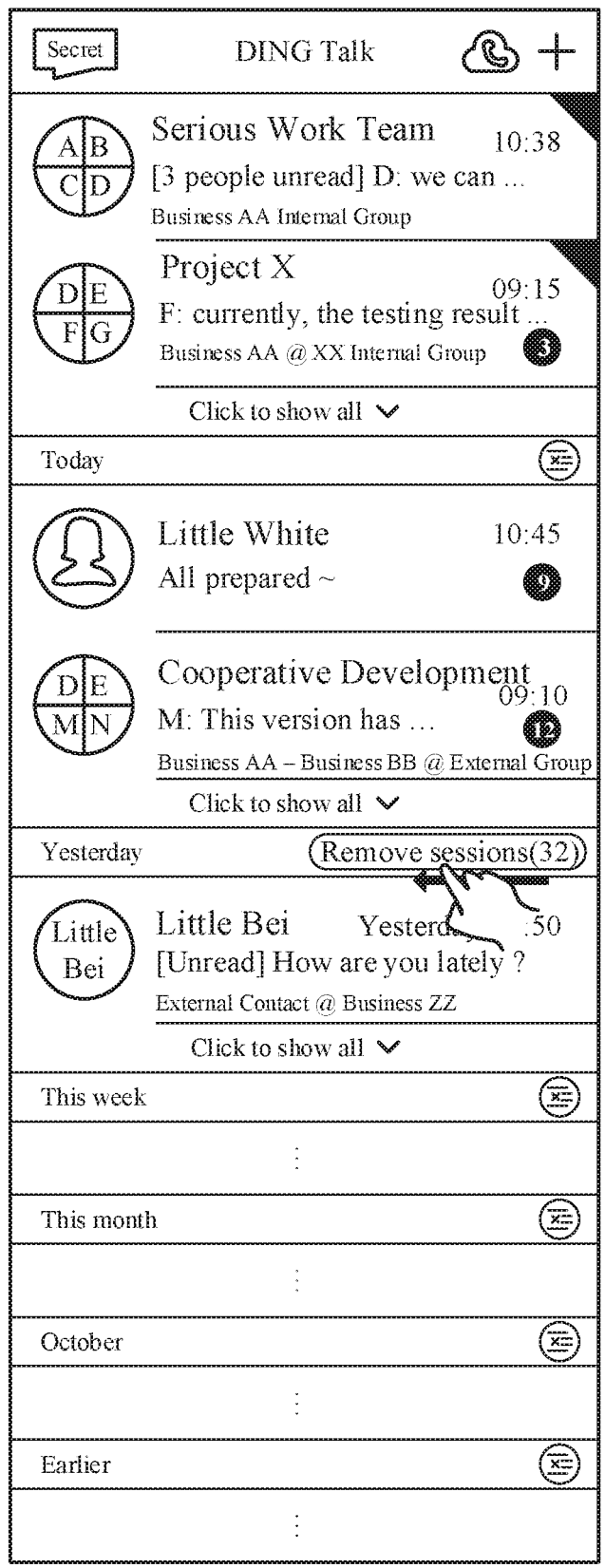
Figure 12:
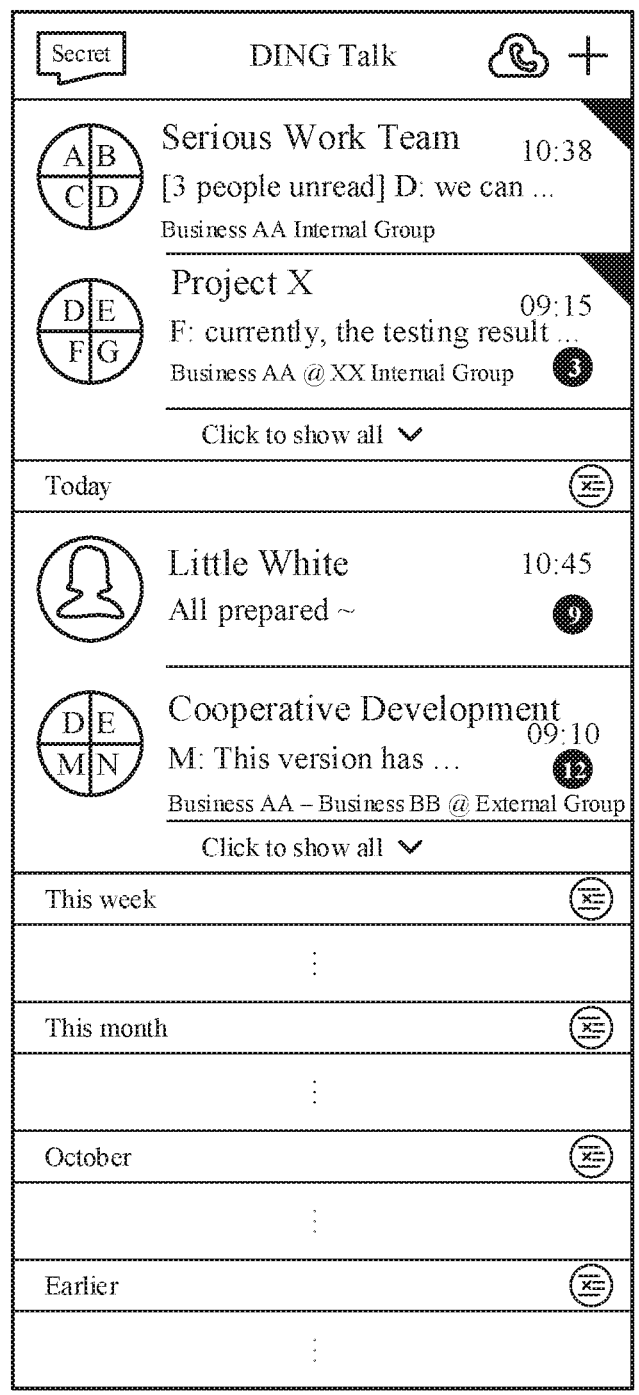

In some embodiments, when a session elimination instruction for a group is detected, all session page entries corresponding to the group can be deleted from the session list page. For example, as shown in FIG. 10, an operation identifier can be displayed at the upper right corner of each of the groups, "today," "yesterday," "this week," and "this month." With the "yesterday" group as an example, when a first trigger operation (e.g., a clicking operation) on the operation identifier at the upper right corner of the "yesterday" group is detected, the operation identifier can be updated to be the prompt identifier "remove sessions (32)" as shown in FIG. 11. When a second trigger operation on the prompt identifier is detected, all session page entries in the "yesterday" group can be deleted to obtain the session list page shown in FIG. 12. The above "session elimination instruction" can be regarded as being divided into two parts that correspond to the above "first trigger operation" and "second trigger operation" respectively. Namely, it is regarded that the "session elimination instruction" is received only when the "first trigger operation" and "second trigger operation" are detected respectively. The "second trigger operation" is equivalent to an opportunity of "second confirmation" that is provided to the local end user, so that the local end user can avoid mistakenly deleting session page entries in the corresponding group by rejecting the execution of the "second trigger operation" after having mistakenly executed the "first trigger operation."

The above "session elimination instruction" may also not include a "second confirmation." The "yesterday" group shown in FIG. 10 is still used as an example. Upon detecting a trigger operation (e.g., a clicking operation) on the operation identifier at the upper right corner of the "yesterday" group, a DING Talk client can immediately delete all session page entries in the "yesterday" group to obtain the session list page shown in FIG. 12.

By grouping session page entries on a session list page, therefore, the local end user can delete all session page entries in the same group at the same time with no need to delete the session page entries one by one, which helps simplify user operations and improve the management efficiency for session page entries.

In the above embodiments, the session list page comprises session page entries of all communication sessions in which the local end user participates, and these session page entries are displayed in groups. For some session page entries, however, the local end user may actually not care about communication messages in the corresponding communication sessions. Therefore, these session page entries waste the display space on the session list page, which is already a type of scare resources, and may affect the efficiency of processing interested communication sessions by the local end user.

Therefore, a high-efficiency mode for a session list page is disclosed, which can further improve the communication efficiency for the local end user. A high-efficiency mode based display solution will be described in detail below with reference to FIGS. 13-17.

Figure 13:
FIG. 13 is a schematic diagram of a session list page without turning on a high-efficiency mode according to an exemplary embodiment of the present disclosure.

As shown in FIG. 13, a mode switch 1301 can be added on the session list page. The local end user can configure the mode switch 1301 to determine whether to implement the above high-efficiency mode on the session list page. On the session list page shown in FIG. 13, the mode switch 1301 is set to the left, which is a closed position, indicating that the high-efficiency mode is not turned on at this moment. Therefore, session page entries corresponding to all communication sessions in which the local end user participates are displayed on the session list page. When the local end user slides the above mode switch 1301 to the right, the above high-efficiency mode can be turned on. Then, the session list page may only display session page entries that meet a preset condition and does not need to display session page entries that do not meet the preset condition. The preset condition can be set by the local end user according to actual needs, to ensure that all session page entries displayed on the session list page can satisfy the actual needs of the local end user, which helps improve the communication efficiency of the local end user.

Figure 14:
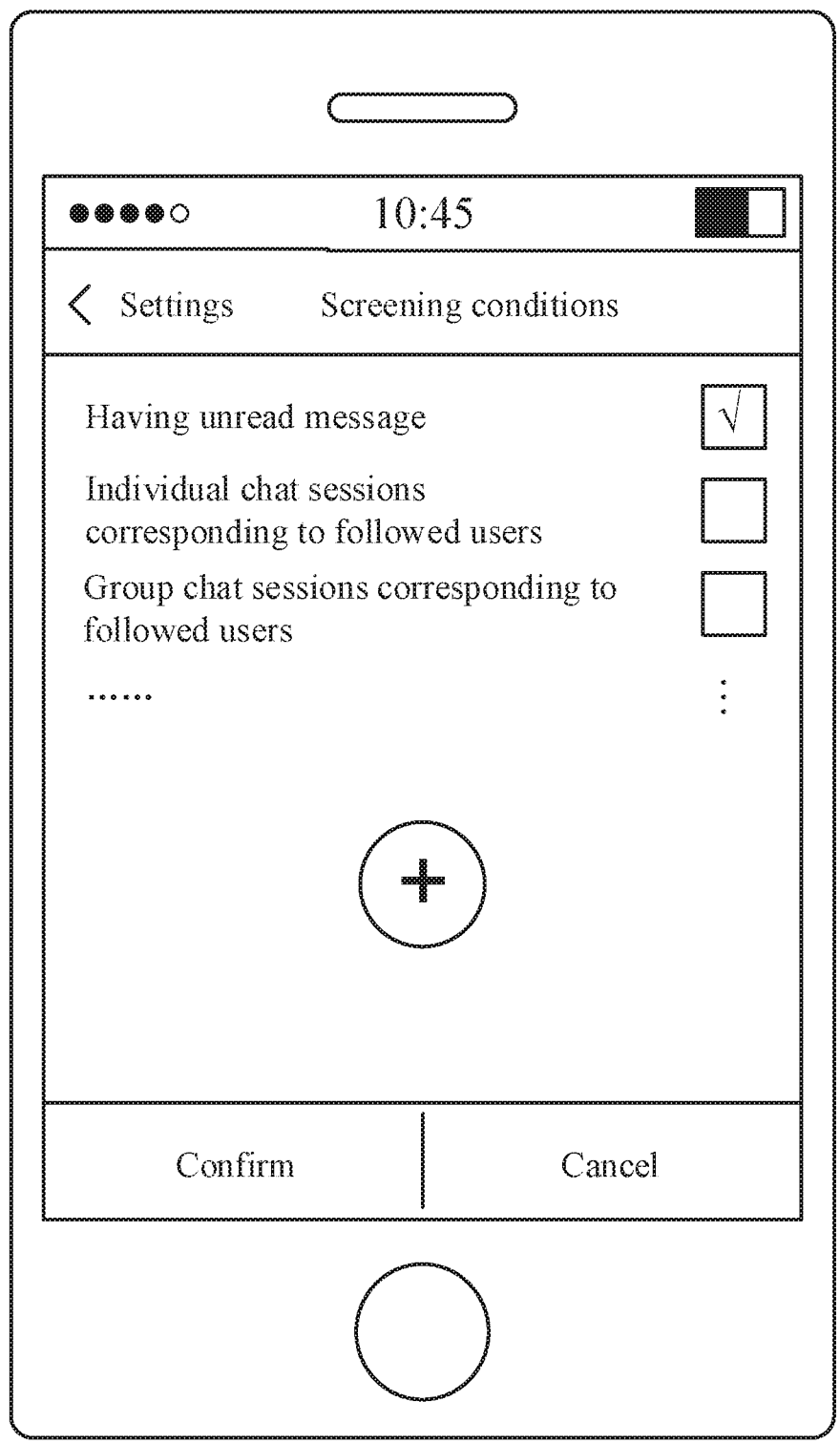
FIG. 14 is a schematic diagram of a screening condition setting page according to an exemplary embodiment of the present disclosure.

The local end user can set a desired preset condition via the screening condition setting page shown in FIG. 14. For example, the candidate screening conditions can comprise:

1) Having unread message. The session list page can display session page entries corresponding to communication sessions that have unread messages, and does not display session page entries corresponding to communication sessions that do not have unread messages.

2) Individual chat sessions corresponding to followed users. The session list page can display individual chat-type communication sessions corresponding to users followed by the local end user, and does not display individual chat-type communication sessions corresponding to users not followed by the local end user. Here, the followed users may be independently set by the local end user, or may be determined by an electronic device, a Ding Talk client or a Ding Talk server through analysis of historical data of the local end user. For example, it is found, according to the historical data, that the frequency of historical communication between the local end user and a user is higher than a preset frequency, the user can be automatically set to be a followed user of the local end user.

3) Group chat sessions corresponding to followed groups. The session list page can display group chat-type communication sessions corresponding to groups followed by the local end user, and does not display group chat-type communication sessions corresponding to groups not followed by the local end user. Similar to followed users, the followed groups may be independently set by the local end user, or may also be determined by an electronic device, a Ding Talk client, or a Ding Talk server through analysis of historical data of the local end user, which will not be repeated herein.

In addition to the above three conditions, the present application can further apply other conditions, and the local end user can also create new conditions according to actual needs (e.g., activating a creation operation by triggering the " ᶜ " icon in FIG. 14), which is not restricted in the present disclosure. When the local end user simultaneously activates a plurality of conditions, an action manner of "union" or "intersection" may be adopted among these conditions. For example, when the action manner of "union" is adopted, if the local end user selects "Having unread message" and "Individual chat sessions corresponding to followed users," it is determined that the preset condition is met when a session page entry meets at least one of these two conditions. When the action manner of "intersection" is adopted, it is determined that the preset condition is met only when a session page entry simultaneously meets both of the two conditions.

Figure 15:
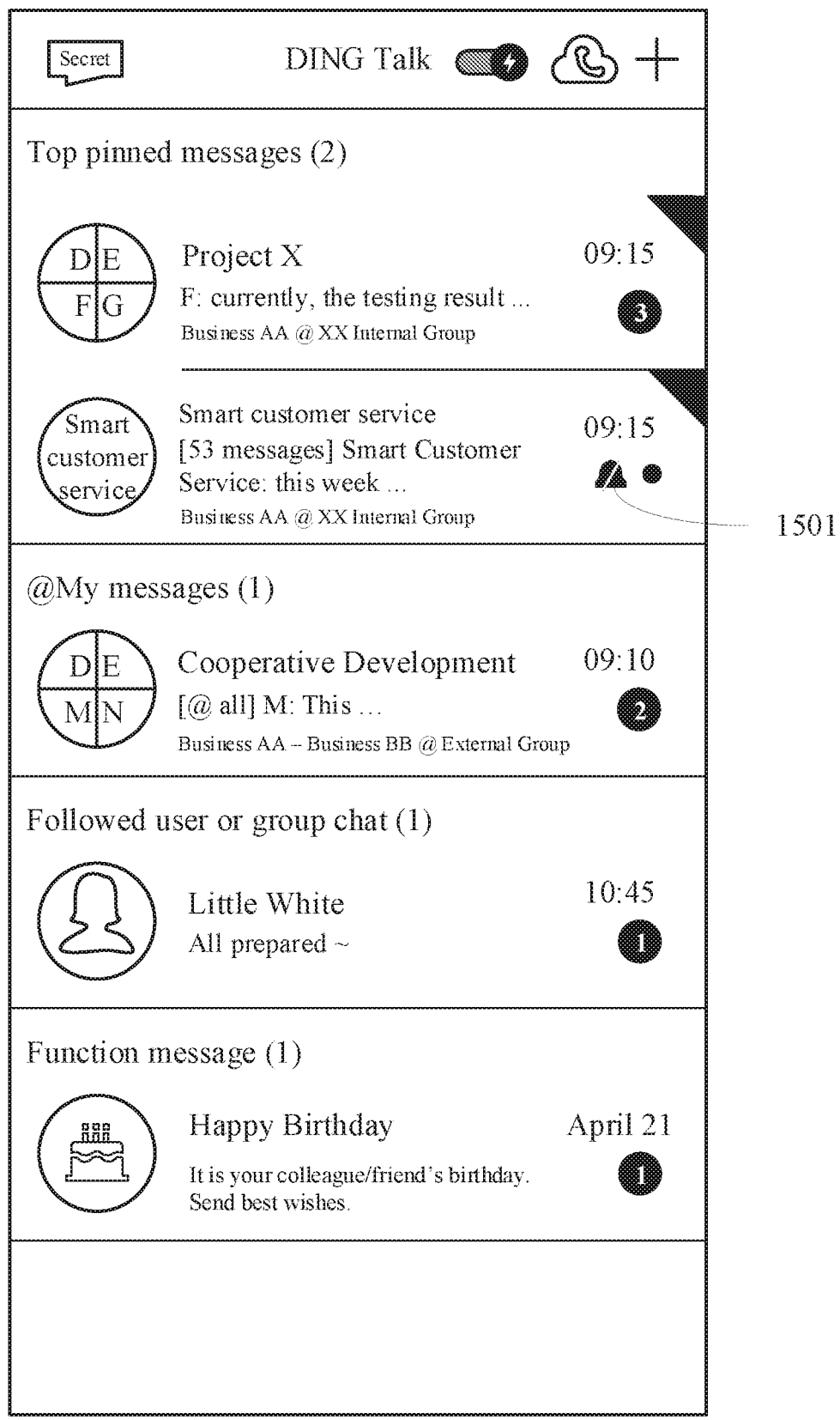
FIG. 15 to FIG. 17 are schematic diagrams of a session list page with a high-efficiency mode turned on according to an exemplary embodiment of the present disclosure.

Assuming that the preset condition below is "Having unread message," a display solution may comprise: as shown in FIG. 15, when the high-efficiency mode is turned on, all session page entries that do not have unread messages in FIG. 13 are hidden (i.e., not displayed), while only session page entries that have unread messages are displayed, including session page entries of group communication sessions corresponding to the groups of "Project X," "Smart Customer Service," and "Cooperative Development" ("Smart Customer Service" turns on the "Do not disturb" function, and therefore, the manner of "the Do not disturb identifier 1501+a black dot" is used as prompt information for "unread messages," which is different from the prompt information in the form of "Number of unread messages+a black round background" used by other communication sessions), a session page entry of an individual chat communication session corresponding to the user "Little White," and a session page entry corresponding to a functional message "Happy Birthday."

Furthermore, in the embodiment shown in FIG. 15, the session page entries on the session list page can be displayed in groups according to a preset dimension, similar to the embodiments shown in FIGS. 9-12. Here, for the "preset dimension," reference may be made to the description in the above embodiments, which will not be repeated herein. For example, the session page entries on the session list page in FIG. 15 can be divided into a plurality of groups, such as "Top pinned messages," "@My messages," "Followed users or group chats," and "Functional messages," and session page entries corresponding to the groups can be displayed in corresponding display areas respectively, to facilitate the local end user to quickly search for an interested group or to perform overall management (e.g., overall deletion and the like) on session page entries in the same group, which helps improve the operation efficiency.

Figure 16:
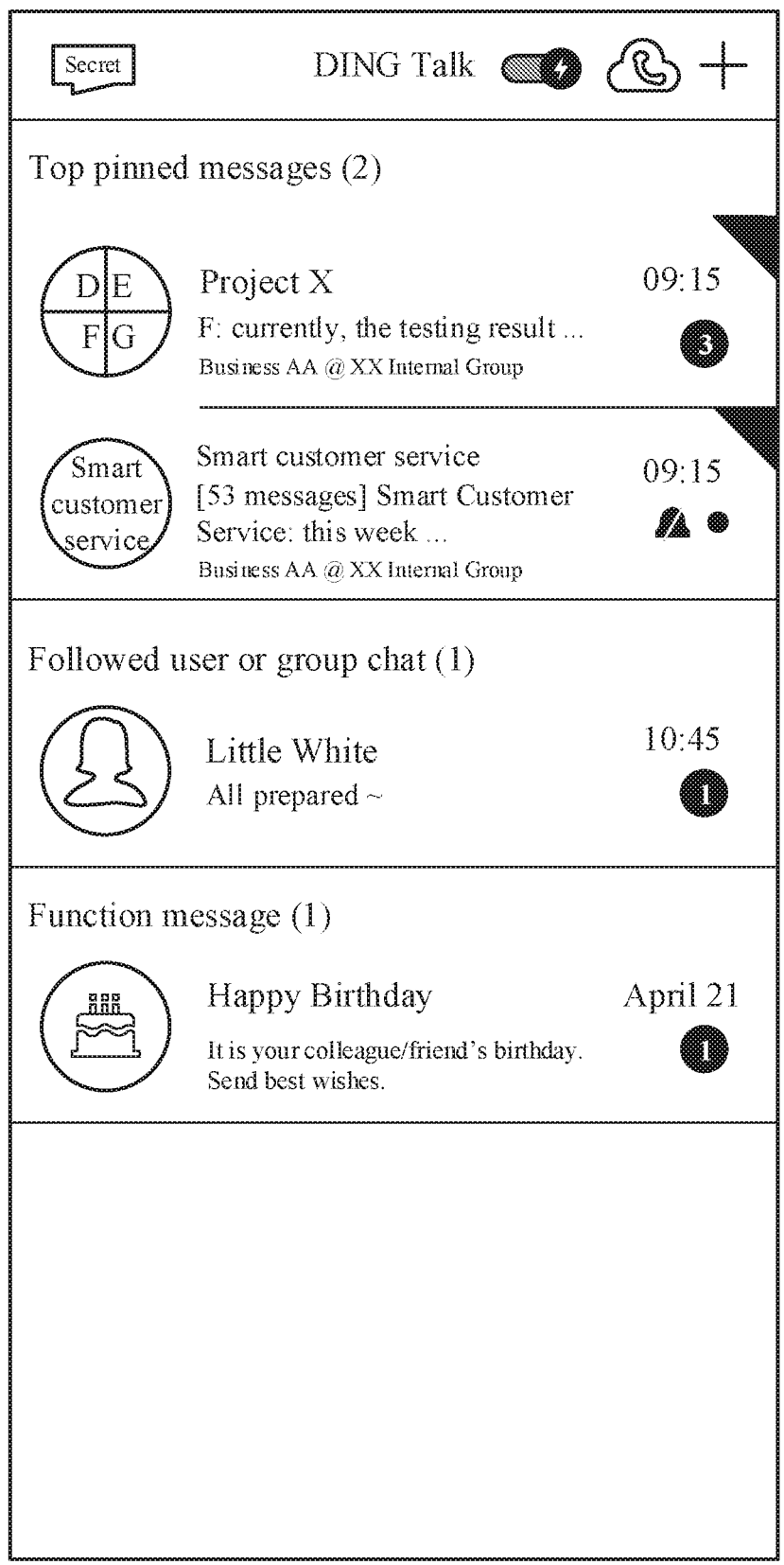
Figure 17:
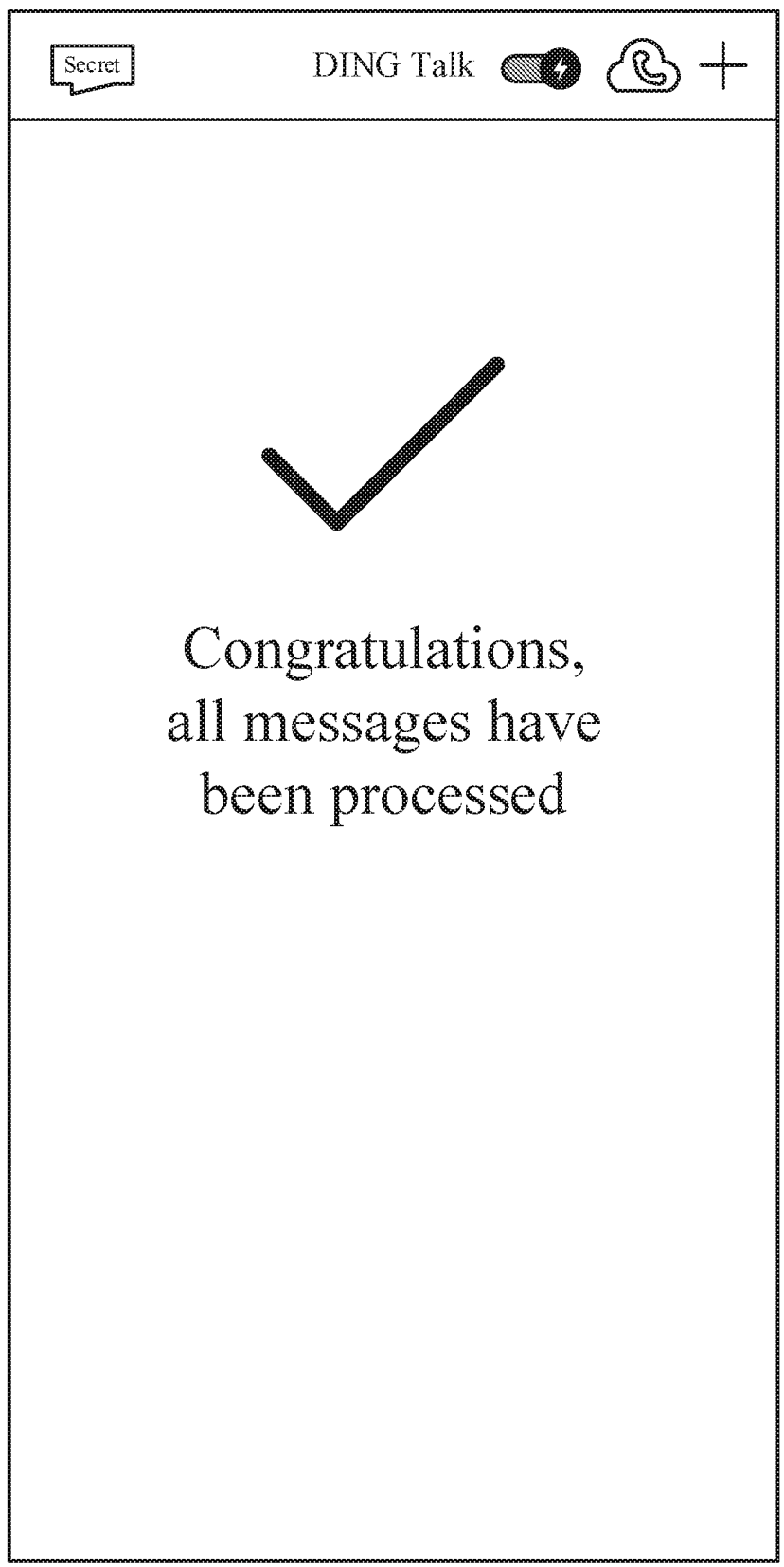

Assuming that the local end user has checked the communication session page of the group "Cooperative Development" and there is no longer any unread message in the group "Cooperative Development," the corresponding session page entry is no longer displayed on the session list page, as shown in FIG. 16. Furthermore, if the local end user has checked all unread messages, respectively, and there is no communication session that has unread messages, the session list page can then display no session page entry, but prompt information like "√" and "Congratulations, all messages have been processed," as shown in FIG. 17.

If the local end user wants to search for a session page entry that does not meet the above preset condition, the local end user can make the session list page to re-display session page entries corresponding to all communication sessions in which the local end user participates by turning off the above high-efficiency mode, to facilitate the local end user to search for a session page entry corresponding to an interested communication session.

Figure 18:
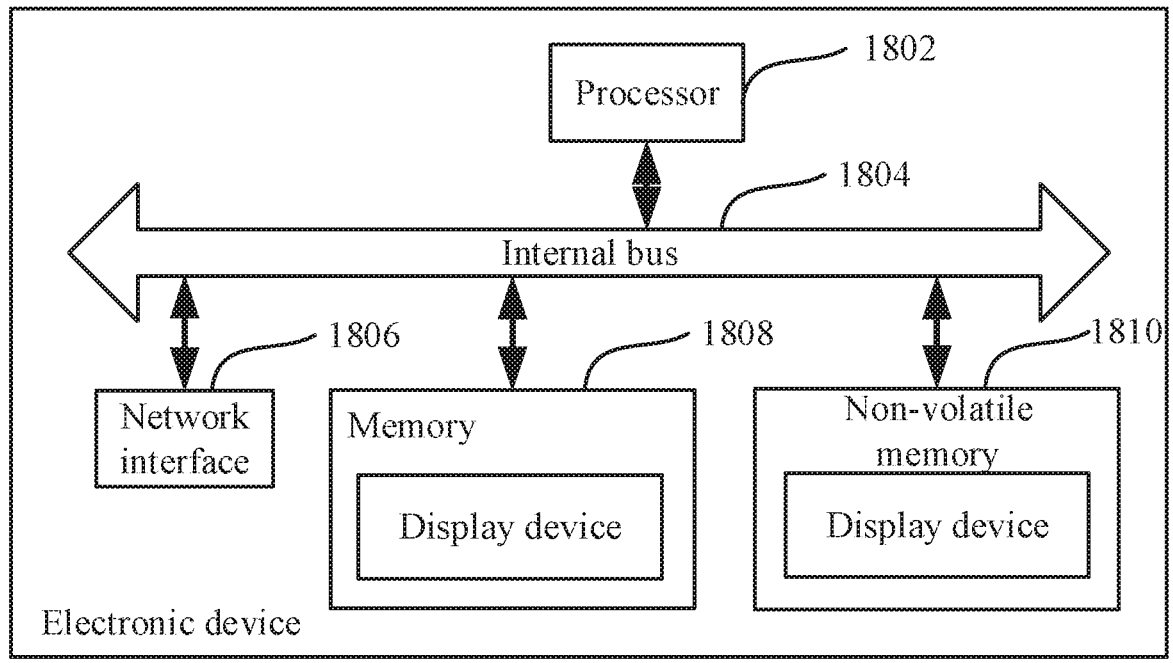
FIG. 18 is a schematic structural diagram of an electronic device according to an exemplary embodiment of the present disclosure.

FIG. 18 is a schematic structural diagram of an electronic device (e.g., computer, server, mobile phone, pad, wearable device, etc.) according to an exemplary embodiment of the present disclosure. Referring to FIG. 18, the hardware of the electronic device comprises a processor 1802, an internal bus 1804, a network interface 1806, a memory 1808, and a non-volatile memory 1810. The electronic device may also comprise other hardware required by services. The processor 1802 reads a corresponding computer program from the non-volatile memory 1810 into the memory 1802, and the program runs to form a logic display apparatus. In addition to the software implementation manner, the present disclosure does not exclude other implementation manners, such as logic devices or a manner that combines software and hardware. In other words, entities executing the following processing procedure are not limited to logic units, but may also include hardware or logic devices. In some embodiments, a non-transitory computer-readable storage medium (e.g., the memory 1808 and/or the non-volatile memory 1810) may store instructions that when executed by the processor 1802, cause the electronic device (e.g., the processor 1802) to perform one or more steps or methods described herein. For example, a non-transitory computer-readable storage medium may store instructions that, when executed by a processor, cause the processor to perform a display method. The display method may comprise: displaying a session list page, the session list page comprising a session page entry corresponding to a communication session in which a local end user participates; determining a read/unread status of a sent communication message by the local end user in the communication session; and displaying, in a display area of the session page entry corresponding to the communication session, a status identifier corresponding to the read/unread status. In some embodiments, the instructions may be referred to as a display device. When implemented as a software, the display device may correspond to software instructions.

Figure 19:
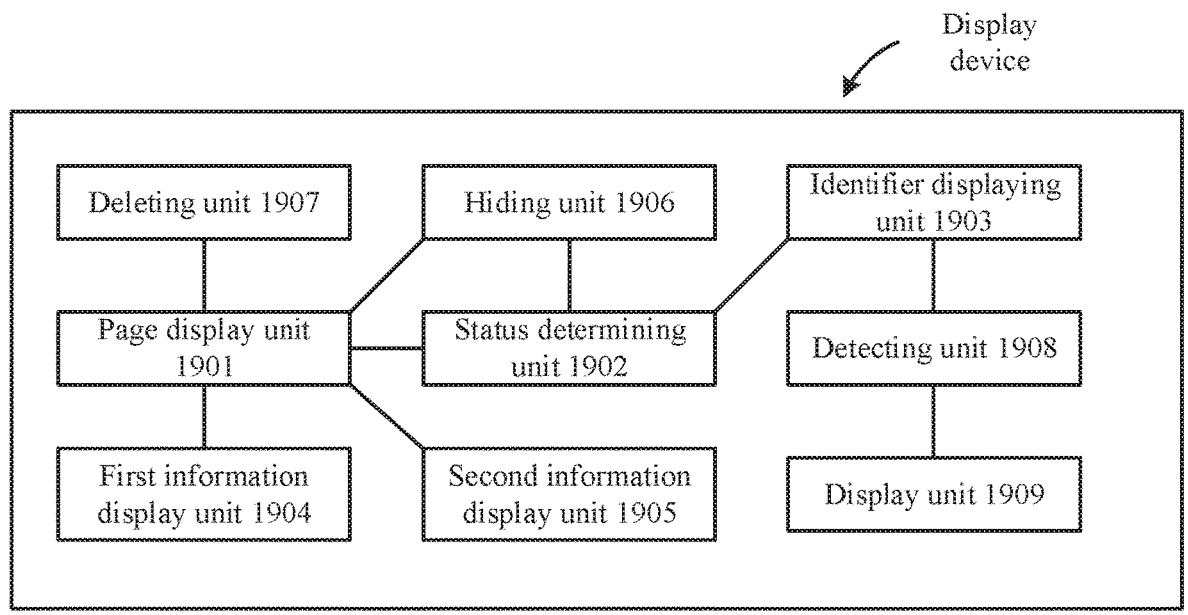
FIG. 19 is a block diagram of a display device according to an exemplary embodiment of the present disclosure.

Referring to FIG. 19, in a software implementation manner, the display device may comprise a page display unit 1901, a status determining unit 1902, and an identifier display unit 1903, wherein: the page display unit 1901 is configured to display a session list page of a preset communication application, and the session list page comprises a session page entry corresponding to a communication session in which a local end user participates; the status determining unit 1902 is configured to determine a read/unread status of a sent communication message by the local end user in at least one communication session; and the identifier displaying unit 1903 is configured to display, in a display area of the session page entry corresponding to the at least one communication session, a pre-defined status identifier corresponding to the read/unread status. In some embodiments, the display device and various units described herein may be implemented as software instructions.

Optionally, the identifier displaying unit 1903 is configured to display a pre-defined status identifier corresponding to the read/unread status in at least one of the following manners: when the read/unread status indicates that a sent communication message in the unread status exists in any communication session, the identifier displaying unit 1903 displays a pre-defined unread identifier; and when the read/unread status indicates that all sent communication messages in any communication session are in the read status, the identifier displaying unit 1903 displays a pre-defined read identifier.

Optionally, the display device may further comprise: a first information display unit 1904 configured to display, for an individual chat communication session between the local end user and any opposite end user, organizational affiliation information of the any opposite end user in a display area of a session page entry corresponding to the individual chat communication session, when the organizational affiliation information of the local end user is inconsistent with the organizational affiliation information of the any opposite end user; and a second information display unit 1905 configured to display, for a group chat communication session of any group to which the local end user belongs and when the any group has organizational affiliation information, the organizational affiliation information of the any group in a display area of a session page entry corresponding to the group chat communication session, and indicate the consistency between the organizational affiliation information of the local end user and the organizational affiliation information of the any group.

Optionally, the page display unit 1901 may be configured to: display session page entries on the session list page in groups according to a preset dimension; wherein different groups of session page entries are displayed in display areas at different positions of the session list page.

Optionally, the preset dimension may comprise at least one of the following: time period in which the latest communication time falls, organizational affiliation information, top pinning situation, etc.

Optionally, the display device may further comprise: a hiding unit 1906 configured to fold and hide, when any communication session does not have unread received communication messages or sent communication messages in the unread status, a session page entry corresponding to the any communication session in the display area corresponding to the group thereof.

Optionally, the display device may further comprise: a deleting unit 1907 configured to delete, when a session elimination instruction for any group is detected, all session page entries corresponding to the any group from the session list page.

Optionally, the identifier displaying unit 1903 may be configured to: display, when a preview content of a communication message of any communication session is displayed in a display area of a session page entry corresponding to the any communication session, the pre-defined status identifier close to the preview content.

Optionally, the display device may further comprise: a detecting unit 1908 configured to detect a trigger operation for the pre-defined status identifier; and a display unit 1909 configured to display, if the read/unread status corresponding to the pre-defined status identifier is the unread status, the information of opposite end users who have not read the sent communication message.

Optionally, session page entries on the session list page may comprise session page entries that meet a preset condition, while session page entries that do not meet the preset condition are hidden.

Optionally, the preset condition may comprise at least one of the following: a corresponding communication session comprises at least one received communication message in the unread status; a corresponding communication session comprises at least one received group chat message in the unread status, and the received group chat message comprises separate notification instruction information for the local end user; an opposite end communicating party of a corresponding communication session is a preset followed user of the local end user; a group to which a corresponding communication session belongs is a preset followed group of the local end user; a corresponding communication session is not shielded; and a corresponding communication session is used to transmit functional messages related to application functions in the preset communication application.

Optionally, when the high-efficiency mode of the session list page is configured to be in the on status, session page entries on the session list page may only comprise session page entries that meet the preset condition; and when the high-efficiency mode of the session list page is configured to be in the off status, session page entries on the session list page may comprise session page entries corresponding to all communication sessions in which the local end user participates.

The systems, devices, modules, or units illustrated in the foregoing embodiments can, for example, be implemented by a computer chip or an entity, or implemented by a product having a particular function. A typical implementation device is a computer. For example, the computer can be a personal computer, a laptop computer, a cellular phone, a camera phone, a smart phone, a personal digital assistant, a media player, a navigation device, an e-mail device, a game console, a tablet computer, a wearable device, or a combination of any of these devices.

In a typical configuration, a computation device includes one or more Central Processing Units (CPUs), input/output interfaces, network interfaces, and a memory.

The memory may include computer-readable media, such as a volatile memory, a Random Access Memory (RAM), and/or a non-volatile memory, e.g., a Read-Only Memory (ROM) or a flash RAM. The memory is an example of the computer-readable medium.

Computer-readable media include permanent, volatile, mobile, and immobile media, which can implement information storage through any method or technology. The information may be computer-readable instructions, data structures, program modules or other data. Examples of storage media of computers include, but are not limited to, Phase-change RAMs (PRAMs), Static RAMs (SRAMs), Dynamic RAMs (DRAMs), other types of Random Access Memories (RAMs), Read-Only Memories (ROMs), Electrically Erasable Programmable Read-Only Memories (EEPROMs), flash memories or other memory technologies, Compact Disk Read-Only Memories (CD-ROMs), Digital Versatile Discs (DVDs) or other optical memories, cassettes, cassette and disk memories or other magnetic memory devices, or any other non-transmission media, which can be used for storing information accessible to a computation device. In some embodiments, the computer-readable media do not include transitory media, such as modulated data signals and carriers.

The terms of "including," "comprising," or any other variants thereof intend to encompass a non-exclusive inclusion, such that a process, method, commodity, or device comprising a series of elements not only comprises these elements, but also comprises other elements that are not specifically listed, or further comprises elements that are inherent to the process, method, commodity, or device.

Absent further restrictions, elements defined by the statement "comprising one . . . " does not exclude additional similar elements in a process, method, commodity, or device comprising the above elements.

Exemplary embodiments are described in detail, and examples thereof are illustrated in the accompanying drawings. When the above description involves the accompanying drawings, identical numerals in different figures designate identical or similar elements, unless otherwise expressly noted. The implementation manners described in the exemplary embodiments do not represent all implementation manners consistent with the present disclosure. They are merely examples of devices and method that are consistent with some aspects of the present disclosure.

Terms in the present disclosure are used only for the purpose of describing particular embodiments, rather than intended to limit the present disclosure. "One," "the," and "that" used in the singular form in the present disclosure and the appended claims are also intended to include the plural form, unless other meanings are clearly indicated in the context. The term "and/or" used herein refers to and comprises any or all possible combinations of one or more associated listed items.

Various information may be described by using the terms, first, second, third, and the like in the present disclosure, but the information is not limited to these terms. These terms are merely used to distinguish information of the same type. For example, without departing from the scope of the present disclosure, the first information may also be referred to as the second information, and similarly, the second information may also be referred to as the first information. Depending on the context, the term "if" used herein may be interpreted as "at the moment of . . . ," or "when . . . ," or "in response to the determination."

Only preferred embodiments of the present disclosure are described above, which are not used to limit the present disclosure. Any modification, equivalent substitution, or improvement made within the spirit and principle of the present disclosure shall be encompassed by the scope of the present disclosure.

The invention claimed is:

1. A display method, comprising:
    displaying a session list page, the session list page comprising a plurality of session page entries respectively corresponding to a plurality of communication sessions in which a local end user participates, wherein each of the plurality of communication sessions comprises the local end user and one or more opposite end users, wherein the displaying comprises:
        when a communication session comprises a group chat communication session of a group to which the local end user belongs and the group has organizational affiliation information, displaying the organizational affiliation information of the group, and indicating a consistency between organizational affiliation information of the local end user and the organizational affiliation information of the group;
    determining, for each of the plurality of communication sessions, a quantity of one or more communication messages sent by the local end user in the communication session that have not been read by all of the one or more opposite end users;
    displaying, based on the determined quantity in a display area of each session page entry of the plurality of session page entries in the session list page, a status identifier of the communication session wherein the displaying the status identifier comprises:
        when only one communication message sent by the local end user has not been read by all of the one or more opposite end users, displaying a quantity of the one or more opposite end users who have not read the sent communication message, and
        when more than one communication messages sent by the local end user have not been read by all of the one or more opposite end users, displaying a number representing a quantity of the more than one communication messages within the communication session that have not been read by all of the one or more opposite end users without displaying the more than one communication messages;
    in response to a trigger operation on the status identifier being detected, displaying a pop-up window comprising information of the one or more opposite end users who have not read the one or more communication messages and a selectable prompt option; and
    in response to detecting a trigger operation being applied on the selectable prompt option in the pop-up window, sending a prompt message that is different from the one or more communication messages to each of the one or more opposite end users who have not read the one or more communication messages as a reminder to read the one or more communication messages.

2. The method according to claim 1, wherein the displaying the status identifier further comprises at least one of the following:
    when at least one sent communication message in an unread status exists in the communication session, displaying an unread identifier in the display area; or
    when all sent communication messages in the communication session are in a read status, displaying a read identifier in the display area.

3. The method according to claim 1, further comprising:
    when the communication session comprises an individual chat communication session between the local end user and an opposite end user, displaying, for the individual chat communication session between the local end user and the opposite end user, organizational affiliation information of the opposite end user in another display area of the session page entry corresponding to the individual chat communication session, when the organizational affiliation information of the local end user is inconsistent with the organizational affiliation information of the opposite end user.

4. The method according to claim 1, wherein the step of displaying a session list page comprises:
    displaying the plurality of session page entries on the session list page in groups according to a dimension, wherein different groups of the session page entries are displayed in display areas at different positions of the session list page.

5. The method according to claim 4, wherein the dimension comprises at least one of the following:
    a time period in which a latest communication time falls, the organizational affiliation information, or top pinning situation.

6. The method according to claim 4, further comprising:
    folding and hiding, when the communication session has neither unread received communication message nor sent communication message in an unread status, the session page entry corresponding to the communication session in a display area corresponding to the group associated with the communication session.

7. The method according to claim 1, wherein the displaying the status identifier further comprises:

displaying, when a preview content of a communication message of the communication session is displayed in the display area of the session page entry corresponding to the communication session, the status identifier close to the preview content.

8. The method according to claim 1, wherein the displaying the pop-up window comprising the information of the one or more opposite end users who have not read the one or more communication messages comprises: displaying head portraits or names of the one or more opposite end users who have not read the sent communication message.

9. The method according to claim 1, wherein each of the plurality of the session page entries meets a condition comprising at least one of:
the corresponding communication session comprises at least one received communication message in an unread status;
an opposite end communicating party of the corresponding communication session is a followed user of the local end user; or
a group to which the corresponding communication session belongs is a followed group of the local end user.

10. The method according to claim 9, wherein:
when a high-efficiency mode of the session list page is configured to be in the on status, the plurality of session page entries on the session list page only comprise session page entries that meet the condition; and
when the high-efficiency mode of the session list page is configured to be in the off status, the plurality of session page entries on the session list page comprise session page entries corresponding to all communication sessions in which the local end user participates.

11. A non-transitory computer-readable storage medium storing instructions that, when executed by a processor, cause the processor to implement operations comprising:
displaying a session list page, the session list page comprising a plurality of session page entries respectively corresponding to a plurality of communication sessions in which a local end user participates, wherein each of the plurality of communication sessions comprises the local end user and one or more opposite end users, wherein the displaying comprises:
when a communication session comprises a group chat communication session of a group to which the local end user belongs and the group has organizational affiliation information, displaying the organizational affiliation information of the group, and indicating a consistency between organizational affiliation information of the local end user and the organizational affiliation information of the group;
determining, for each of the plurality of communication sessions, a quantity of one or more communication messages in the communication session that have not been read by all of the one or more opposite end users;
displaying, based on the determined quantity in a display area of each session page entry of the plurality of session page entries in the session list page, a status identifier of the communication session, wherein the displaying the status identifier comprises:
when only one communication message sent by the local end user has not been read by all of the one or more opposite end users, displaying a quantity of the one or more opposite end users who have not read the sent communication message, and
when more than one communication messages sent by the local end user have not been read by all of the one or more opposite end users, displaying a number representing a quantity of the more than one communication messages within the communication session that have not been read by all of the one or more opposite end users without displaying the more than one communication messages;
in response to a trigger operation on the status identifier being detected, displaying a pop-up window comprising information of the one or more opposite end users who have not read the one or more communication messages and a selectable prompt option; and
in response to detecting a trigger operation being applied on the selectable prompt option in the pop-up window, sending a prompt message that is different from the one or more communication messages to each of the one or more opposite end users who have not read the one or more communication messages as a reminder to read the one or more communication messages.

12. The non-transitory computer-readable storage medium according to claim 11, wherein the displaying the status identifier further comprises at least one of the following:
when at least one sent communication message in an unread status exists in the communication session, displaying an unread identifier in the display area; or
when all sent communication messages in the communication session are in a read status, displaying a read identifier in the display area.

13. A display system, comprising a processor and a non-transitory computer-readable storage medium storing instructions that, when executed by the processor, cause the processor to perform operations comprising:
displaying a session list page, the session list page comprising a plurality of session page entries respectively corresponding to a plurality of communication sessions in which a local end user participates, wherein each of the plurality of communication sessions comprises the local end user and one or more opposite end users, wherein the displaying comprises:
when a communication session comprises a group chat communication session of a group to which the local end user belongs and the group has organizational affiliation information, displaying the organizational affiliation information of the group, and indicating a consistency between organizational affiliation information of the local end user and the organizational affiliation information of the group;
determining, for each of the plurality of communication sessions, a quantity of one or more communication messages in the communication session that have not been read by all of the one or more opposite end users;
displaying, based on the determined quantity in a display area of each session page entry of the plurality of session page entries in the session list page, a status identifier of the communication session, wherein the displaying the status identifier comprises:
when only one communication message sent by the local end user has not been read by all of the one or more opposite end users, displaying a quantity of the one or more opposite end users who have not read the sent communication message, and
when more than one communication messages sent by the local end user have not been read by all of the one or more opposite end users, displaying a number representing a quantity of the more than one communication messages within the communication session that have not been read by all of the one or more opposite end users without displaying the more than one communication messages;

in response to a trigger operation on the status identifier being detected, displaying a pop-up window comprising information of the one or more opposite end users who have not read the one or more communication messages and a selectable prompt option; and in response to detecting a trigger operation being applied on the selectable prompt option in the pop-up window, sending a prompt message that is different from the one or more communication messages to each of the one or more opposite end users who have not read the one or more communication messages as a reminder to read the one or more communication messages.

14. The display system according to claim 13, wherein the displaying the status identifier further comprises at least one of the following:

when at least one sent communication message in an unread status exists in the communication session, displaying an unread identifier in the display area; or when all sent communication messages in the communication session are in a read status, displaying a read identifier in the display area.

15. The display system according to claim 13, wherein the operations further comprise:

when the communication session comprises an individual chat communication session between the local end user and an opposite end user, displaying, for the individual chat communication session between the local end user and the opposite end user, organizational affiliation information of the opposite end user in another display area of the session page entry corresponding to the individual chat communication session, when the organizational affiliation information of the local end user is inconsistent with the organizational affiliation information of the opposite end user.

16. The display system according to claim 13, wherein the step of displaying a session list page comprises:

displaying the plurality of session page entries on the session list page in groups according to a dimension, wherein different groups of the session page entries are displayed in display areas at different positions of the session list page.

17. The display system according to claim 16, wherein the dimension comprises at least one of the following:

a time period in which a latest communication time falls, the organizational affiliation information, or top pinning situation.

18. The display system according to claim 16, wherein the operations further comprise:

folding and hiding, when the communication session has neither unread received communication message nor sent communication message in unread status, the session page entry corresponding to the communication session in a display area corresponding to the group associated with the communication session.

19. The display system according to claim 13, wherein the displaying the status identifier further comprises:

displaying, when a preview content of a communication message of the communication session is displayed in the display area of the session page entry corresponding to the communication session, the status identifier close to the preview content.

20. The display system according to claim 13, wherein the displaying the pop-up window comprising the information of the one or more opposite end users who have not read the one or more communication messages comprises:

displaying head portraits or names of the one or more opposite end users who have not read the sent communication message.

* * * * *